(12) United States Patent
Roberts et al.

(10) Patent No.: US 9,014,564 B2
(45) Date of Patent: Apr. 21, 2015

(54) LIGHT RECEIVER POSITION DETERMINATION

(71) Applicant: Intel Corporation, Santa Clara, CA (US)

(72) Inventors: Richard D. Roberts, Hillsboro, OR (US); Jing Zhu, Portland, OR (US); Mathys C. Walma, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 211 days.

(21) Appl. No.: 13/625,361

(22) Filed: Sep. 24, 2012

(65) Prior Publication Data

US 2014/0086587 A1 Mar. 27, 2014

(51) Int. Cl.
*H04B 10/00* (2013.01)
*H04B 10/116* (2013.01)

(52) U.S. Cl.
CPC .................................. *H04B 10/116* (2013.01)

(58) Field of Classification Search
None
See application file for complete search history.

(56) References Cited

U.S. PATENT DOCUMENTS

| | | | |
|---|---|---|---|
| 4,422,099 A | 12/1983 | Wolfe | |
| 5,394,259 A | 2/1995 | Takahara | |
| 5,531,642 A | 7/1996 | Shiomi et al. | |
| 5,577,733 A | 11/1996 | Downing | |
| 5,600,471 A | 2/1997 | Hirohashi et al. | |
| 5,970,208 A | 10/1999 | Shim | |
| 6,570,694 B1 | 5/2003 | Yegnanarayanan | |
| 6,819,878 B1 | 11/2004 | King et al. | |
| 6,941,076 B1 | 9/2005 | Adams et al. | |
| 7,149,256 B2 | 12/2006 | Vrazel et al. | |
| 7,415,212 B2 * | 8/2008 | Matsushita et al. | 398/140 |
| 8,238,014 B2 | 8/2012 | Kucharski et al. | |
| 8,520,065 B2 * | 8/2013 | Staats et al. | 348/61 |
| 8,579,437 B2 | 11/2013 | Su et al. | |
| 8,588,621 B2 | 11/2013 | Dahan et al. | |
| 8,665,508 B2 | 3/2014 | Kucharski et al. | |
| 2001/0055136 A1 | 12/2001 | Horiuchi et al. | |
| 2002/0085094 A1 | 7/2002 | Teuchert | |
| 2002/0089722 A1 | 7/2002 | Perkins et al. | |

(Continued)

FOREIGN PATENT DOCUMENTS

| | | |
|---|---|---|
| EP | 1436952 A1 | 7/2004 |
| EP | 2106041 A1 | 9/2009 |

(Continued)

OTHER PUBLICATIONS

Notice of Allowance received for U.S. Appl. No. 13/460,224, mailed on Apr. 16, 2014, 13 pages.

(Continued)

*Primary Examiner* — Ken Vanderpuye
*Assistant Examiner* — Merlin Brito Peguero
(74) *Attorney, Agent, or Firm* — Garrett IP, LLC

(57) ABSTRACT

A light array includes lights that transmit modulated light to indicate their unique light identifiers (IDs) and lights that transmit unmodulated light. A light receiver records images of the light array and recovers the light IDs from the modulated light. The light receiver uses the IDs to retrieve a light map representative of the light array. The receiver aligns the retrieved light map with the recorded images of the light array, and accesses real-world positions of all of the light in the light array, as deployed, based on the aligned light map. The light receiver determines a 3-dimensional position of the light receiver relative to the light array.

20 Claims, 15 Drawing Sheets

(56) References Cited

U.S. PATENT DOCUMENTS

| | | | |
|---|---|---|---|
| 2004/0120025 | A1 | 6/2004 | LeHoty |
| 2005/0135527 | A1 | 6/2005 | Masui et al. |
| 2006/0239689 | A1 | 10/2006 | Ashdown |
| 2006/0269287 | A1 | 11/2006 | Bidmead et al. |
| 2007/0177161 | A1 | 8/2007 | Ishii et al. |
| 2008/0205900 | A1 | 8/2008 | Cole et al. |
| 2009/0196615 | A1 | 8/2009 | Kauffman |
| 2009/0208221 | A1 | 8/2009 | Sasai |
| 2009/0243815 | A1 | 10/2009 | Tolli |
| 2010/0060972 | A1 | 3/2010 | Kucharski et al. |
| 2010/0250125 | A1 | 9/2010 | Lundberg et al. |
| 2010/0309958 | A1 | 12/2010 | Lakkis |
| 2011/0075581 | A1 | 3/2011 | Mihota |
| 2011/0144941 | A1 | 6/2011 | Roberts |
| 2011/0164881 | A1 | 7/2011 | Rajagopal et al. |
| 2011/0274429 | A1 | 11/2011 | Caplan et al. |
| 2012/0109356 | A1 | 5/2012 | Kong et al. |
| 2012/0162633 | A1 | 6/2012 | Roberts |
| 2012/0315036 | A1 | 12/2012 | Kucharski et al. |
| 2013/0170841 | A1 | 7/2013 | Liu et al. |
| 2013/0287403 | A1 | 10/2013 | Roberts |
| 2014/0003817 | A1 | 1/2014 | Roberts et al. |
| 2014/0003823 | A1 | 1/2014 | Roberts et al. |
| 2014/0006907 | A1 | 1/2014 | Roberts et al. |
| 2014/0093126 | A1 | 4/2014 | Roberts |
| 2014/0093234 | A1 | 4/2014 | Roberts et al. |
| 2014/0093238 | A1 | 4/2014 | Roberts |
| 2014/0093249 | A1 | 4/2014 | Roberts et al. |

FOREIGN PATENT DOCUMENTS

| | | | |
|---|---|---|---|
| JP | 2010-014408 A | 1/2010 | |
| JP | 2010-283616 A | 12/2010 | |
| JP | 50-31427 B2 | 9/2012 | |
| KR | 10-2006-0034883 A | 4/2006 | |
| KR | 10-0761011 B1 | 9/2007 | |
| KR | 10-2011-0083961 A | 7/2011 | |
| KR | 10-1075747 B1 | 10/2011 | |
| KR | 10-2012-0006306 A | 1/2012 | |
| WO | 2008/113861 A2 | 9/2008 | |
| WO | 2011/064342 A1 | 6/2011 | |
| WO | 2012/037528 A2 | 3/2012 | |
| WO | 2012/087944 A2 | 6/2012 | |
| WO | 2013/048502 A1 | 4/2013 | |
| WO | 2013/074065 A1 | 5/2013 | |
| WO | 2013/165751 A1 | 11/2013 | |
| WO | 2014/046757 A1 | 3/2014 | |
| WO | 2014/051754 A1 | 4/2014 | |
| WO | 2014/051767 A1 | 4/2014 | |
| WO | 2014/051768 A1 | 4/2014 | |
| WO | 2014/051783 A1 | 4/2014 | |

OTHER PUBLICATIONS

Non-Final Office Action received for U.S. Appl. No. 13/460,224, mailed on Oct. 11, 2013, 12 pages.

Notice of Allowance received for U.S. Appl. No. 13/539,354, mailed on Apr. 1, 2014, 5 pages.

Non-Final Office Action received for U.S. Appl. No. 13/539,354, mailed on Nov. 21, 2013, 6 pages.

International Preliminary Report on Patentability and Written Opinion received for PCT Patent Application No. PCT/US2011/054441, mailed on Apr. 10, 2014, 8 pages.

International Preliminary Report on Patentability and Written Opinion Received for PCT Patent Application No. PCT/US2011/060578, mailed on May 20, 2014, 5 pages.

International Search Report and Written Opinion received for PCT Patent Application No. PCT/US2013/037787, mailed on Aug. 12, 2013, 9 pages.

International Search Report and Written Opinion received for PCT Patent Application No. PCT/US2013/046224, mailed on Sep. 16, 2013, 3 Pages.

International Search Report and Written Opinion received for PCT Patent Application No. PCT/US2013/047343, mailed on Oct. 7, 2013, 11 pages.

International Search Report and Written Opinion received for PCT Patent Application No. PCT/US2013/047347, mailed on Aug. 27, 2013, 13 pages.

International Search Report and Written Opinion received for PCT Patent Application No. PCT/US2013/047350, mailed on Sep. 25, 2013, 11 pages.

International Search Report and Written Opinion received for PCT Patent Application No. PCT/US2013/047772, mailed on Sep. 27, 2013, 10 Pages.

Horikawa, et al., "Pervasive Visible Light Positioning System using White LED Lighting", vol. 103; No. 721(CS2003 178-197), 2004, pp. 93-99.

International Search Report and Written Opinion received for Patent Application No. PCT/US2011/060578, mailed on Mar. 15, 2012, 10 pages.

International Search Report and Written Opinion received for Patent Application No. PCT/US2011/054441, mailed on Apr. 23, 2012, 11 pages.

Roberts, et al., "Methods and Arrangements for Frequency Shift Communications by Undersampling", PCT Patent Application No. PCT/US2011/060578, filed on Nov. 14, 2011, 33 Pages.

Roberts, Richard R., "Methods and Arrangements for Frequency Shift Communications", PCT Patent Application No. PCT/US2011/054441, filed on Sep. 30, 2011, 23 Pages.

Roberts, et al., "Methods and Arrangements for Error Correction in Decoding Data From an Electromagnetic Radiator", U.S. Appl. No. 13/539,354, filed Jun. 30, 2012, 45 Pages.

Roberts, et al., "Methods and Arrangements for Generating a Waveform for Frequency Shift Keying Communications", U.S. Appl. No. 13/539,351, filed Jun. 30, 2012, 47 Pages.

Daisuke, et al., "A Hybrid and Linear Registration Method Utilizing Inclination Constraint", ISMAR '05 Proceedings of the 4th IEEE/ACM International Symposium on Mixed and Augmented Reality, pp. 140-149.

Yoshino, et al., "High-accuracy Positioning System using Visible LED Lights and Image Sensor", 1-4244-1463-6/08 RWS 2008 IEEE, pp. 439-442.

Tanaka, et al., "New Position Detection Method using Image Sensor and Visible Light LEDs", IEEE Second International Conference on Machine Vision, Dec. 28-30, 2009, pp. 150-153.

Wikipedia, "Rotation matrix", From Wikipedia, the free encyclopedia. Available at: http://en.wikipedia.org/wiki/Rotation_matrix, pp. 1-22.

Roberts, et al., "Methods and Apparatus for Multiphase Sampling of Modulated Light", U.S. Appl. No. 13/630,066, filed Sep. 28, 2012, 71 Pages.

Roberts, Richard R., "Location Detection System", PCT Patent Application No. PCT/US2011/62578, filed on Nov. 30, 2011, 51 Pages.

Gopalakrishnan, et al., "Location Based Technology for Smart Shopping Services", PCT Patent Application No. PCT/US2011/067749, filed on Dec. 29, 2011, 18 Pages.

\* cited by examiner

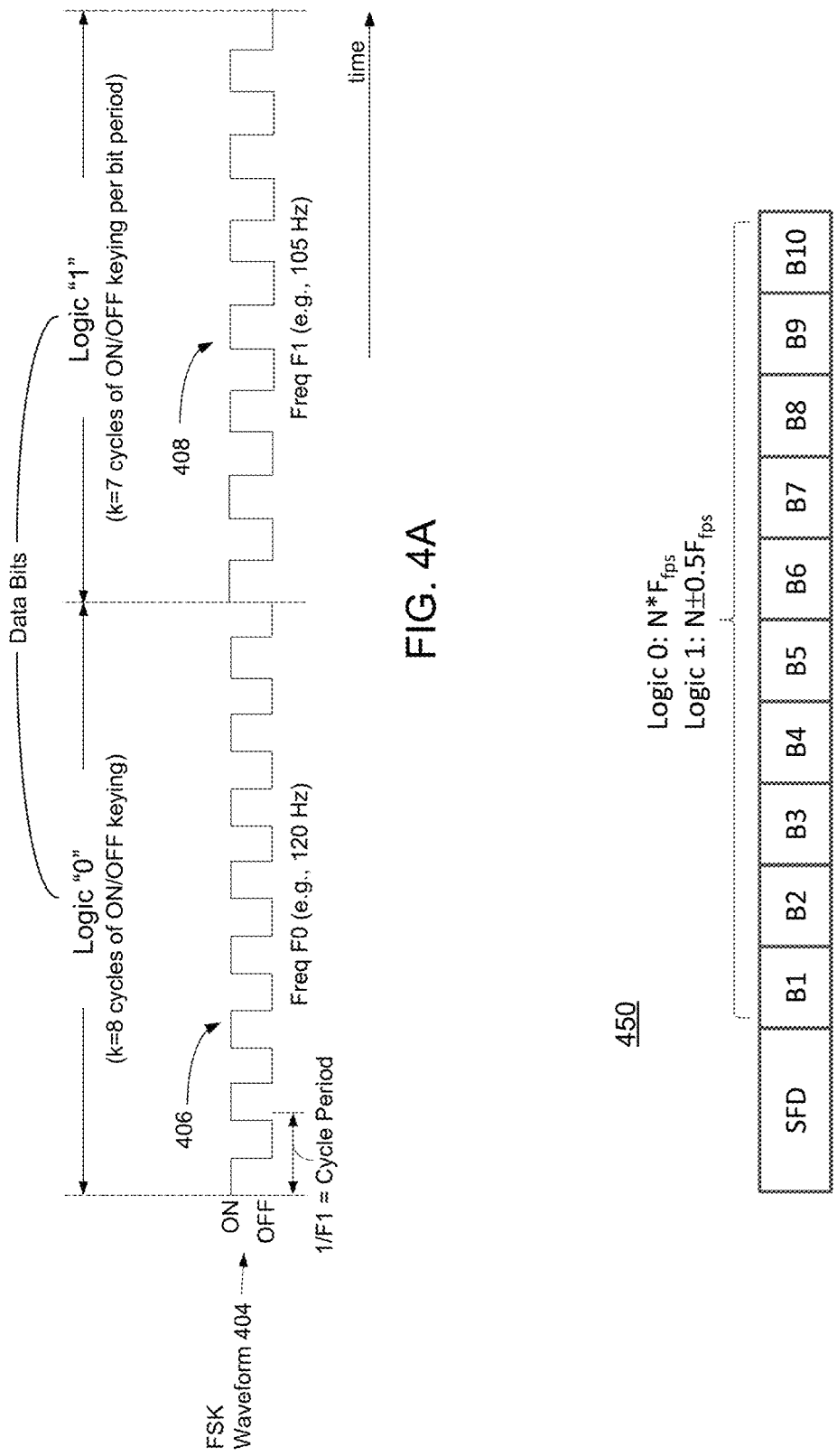

1100

```
┌─────────────────────────────────────────────────┐
│ In a light receiver, sampling and recording     │
│ spatially-separated, modulated (anchor) light   │
│ beams from modulated (anchor) lights and        │─ 1105
│ unmodulated (non-anchor) light beams from       │
│ unmodulated (non-anchor) lights of a light      │
│ array, to produce a sequence of images          │
│ of the light array                              │
└─────────────────────────────────────────────────┘
                         │
                         ▼
┌─────────────────────────────────────────────────┐
│ Demodulating light identifiers (IDs) from the   │─ 1110
│ recorded modulated light beams                  │
└─────────────────────────────────────────────────┘
                         │
                         ▼
┌─────────────────────────────────────────────────┐
│ Accessing a predetermined map of the light      │─ 1115
│ array based on the demodulated light IDs        │
└─────────────────────────────────────────────────┘
                         │
                         ▼
┌─────────────────────────────────────────────────┐
│ Positionally aligning the map with the recorded │─ 1120
│ modulated light beams                           │
└─────────────────────────────────────────────────┘
                         │
                         ▼
┌─────────────────────────────────────────────────┐
│ Accessing real-world positions of the modulated │─ 1125
│ and the unmodulated lights in the light array   │
│ based on the aligned map                        │
└─────────────────────────────────────────────────┘
                         │
                         ▼
┌─────────────────────────────────────────────────┐
│ Photogrammetrically determining a position of   │─ 1130
│ the light receiver relative to the light array  │
│ based on the accessed light positions           │
└─────────────────────────────────────────────────┘
```

FIG. 11

LIGHT RECEIVER POSITION DETERMINATION

BACKGROUND

With the advent of cheap, bright light emitting diodes (LEDs), LED light arrays may be deployed as overhead lights in buildings, such as stores. LED light arrays have the capability to provide adequate area lighting, while being intensity modulated to communicate information, such as shopping information and the like, in a manner that is virtually imperceptible to humans. Conventional smartphones with built-in cameras provide Internet browsing and offer shopper friendly applications, such as global positioning system (GPS) store locator services. However, such applications fall short when it comes to guiding shoppers inside large superstores, for example, because GPS coverage may be lost indoors. While smartphones can capture pictures and videos, the smartphones are limited in their ability to process modulated light from overhead LED light arrays in a manner that supports intelligent applications, such as indoor position determination and guidance that may augment GPS positioning.

BRIEF DESCRIPTION OF THE DRAWINGS/FIGURES

FIG. 4A is an illustration of an example timing diagram of a frequency shift keying (FSK) waveform corresponding to an FSK signal from FIG. 3A.

FIG. 4B is an illustration of an exemplary light packet definition or light packet protocol for light packets formatted and transmitted by the light transmitter of FIG. 3A.

FIG. 11 is a flowchart of an example method summarizing implicit photogrammetric position determination of a light receiver relative to a light transmitter.

DETAILED DESCRIPTION

Described below are embodiments directed to implicit photogrammetric position determination of a light receiver relative to a light transmitter. The photogrammetric embodiments are described most specifically in connection with FIGS. 7-11, and 14. The light transmitter includes an array of lights (i.e., a light array), including anchor (i.e., modulated) lights and non-anchor (i.e., unmodulated) lights. The anchor lights each transmit light modulated to convey a unique light identifier (ID). The non-anchor lights each transmit unmodulated light. The terms "anchor" and "modulated" are used equivalently and interchangeably herein, as are the terms "non-anchor" and "unmodulated."

The light receiver, such as a camera equipped smartphone configured as described herein, records the anchor and non-anchor beams in a sequence of images of the light array. The light receiver demodulates the unique IDs conveyed in the recorded anchor light beams, and uses the demodulated IDs to access a predetermined light map of the light array from a light map database. The demodulated IDs represent indexes by which the light map is indexed or identified. The light map is associated with a table listing all of the light IDs in the light array along with their real-world light positions, i.e., their light positions as deployed in the light array.

The light receiver aligns the accessed light map with the imaged light array, i.e., the light array recorded in the sequence of images. Once aligned, the light map indicates the real-world position of the lights in the light array. The light receiver determines a 3-dimensional position of the light receiver relative to the light array based on the real-world positions using photogrammetric techniques.

Figure 1A:
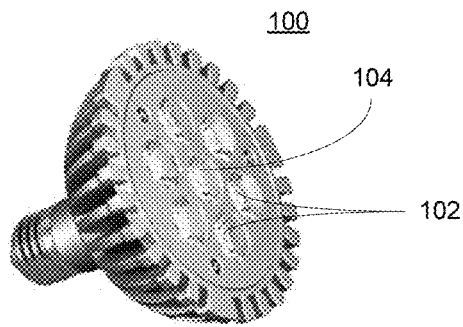
FIG. 1A is an illustration of an example light array, which may operate in accordance with embodiments described herein.

The ensuing description is divided into the following sections:
Light Arrays
Light Beam Diagram
Light Communication System Using FSOOK
Light Transmitter
   Protocol Light Packet Definition
Light Receiver
   Light Detector Array Global and Line Array Exposure Modes
Detector
Controller
Multi-light Transmitter
Implicit Photogrammetric Position Determination
Method Flowchart
Computer Processor System
Wireless Communication Receiver System
General Treatment of Photogrammetric Positioning
Computer Program, Apparatus, and Method Embodiments Light Arrays FIG. 1A is an illustration of an example light array 100, which may operate according to embodiments described herein. Light array 100 includes LEDs 102 that are spatially-separated from each other in 2-dimensions, but clustered closely together around a center LED 104.

Figure 1B:
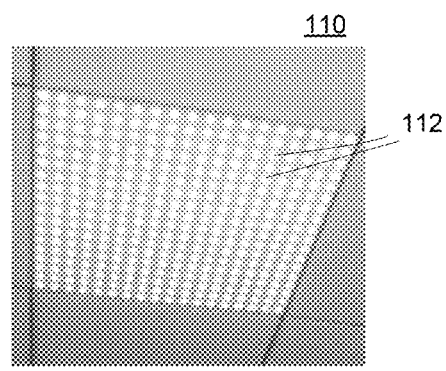
FIG. 1B is an illustration of another example light array, which may operate in accordance with the embodiments described herein.

FIG. 1B is an illustration of an example light array 110, which may operate according to embodiments described herein. Array 110 includes a rectangular array of LEDs 112 that are spatially-separated so as to be relatively far apart from each other compared to lights 102 of array 100.

Figure 1C:
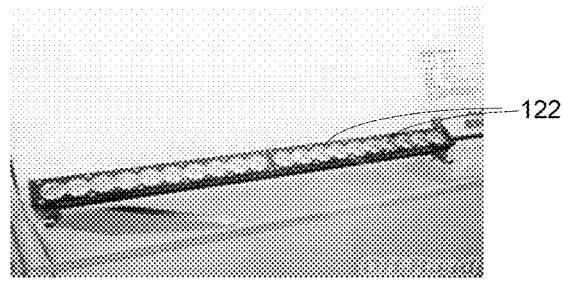
FIG. 1C is an illustration of yet another example light array, which may operate in accordance with the embodiments described herein.

FIG. 1C is an illustration of an example light array 120, which may operate according to embodiments described herein. Array 110 includes a linear array, or line bar, of LEDs 122.

Light Beam Diagram

Figure 2:
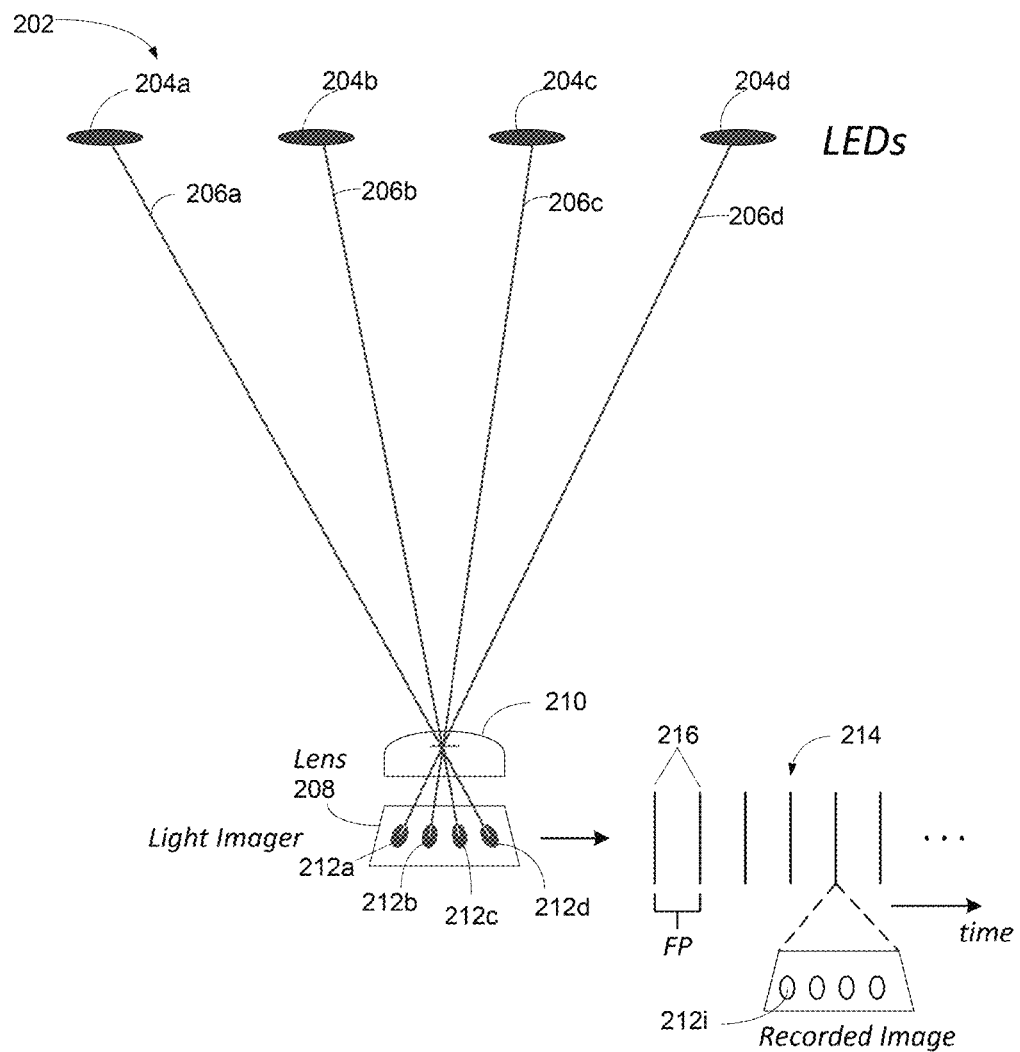
FIG. 2 is a diagram of an example light communication system employing spatially-separated beams.

FIG. 2 is a diagram of an example light array 202 that may operate in accordance with embodiments described herein. FIG. 2 introduces concepts helpful to understanding the embodiments described later. Light array 202 may be configured similarly to any of light arrays 100, 110, and 120, or any other light array including spatially-separated lights. Array 202 includes lights 204a-204d implemented to transmit simultaneously a respective one of free-space optical light beams 206a-206d to a multi-dimensional or planar light imager/sensor 208, through an imaging lens 210. The terms "light beam" and "light" are use equivalently and interchangeably throughout the ensuing description.

Light imager 208 may include a multi-dimensional charge coupled device (CCD) array including many sensor pixels or light detectors, as is known in the art. Light beams 206a-206d are sufficiently spatially-separated from one another as to form corresponding beam images 212a-212d, or light spots, on spatially-separated areas of light imager 208. Each of light spots/areas 212i occupies a position, e.g., an x-y position on a light sensor plane of the light imager, corresponding to a cluster of sensor pixels. Over time, light imager 208 repetitively captures or records, simultaneous light beams 206i impinging on areas 212i, to produce a time-ordered sequence 214 of recorded images 216 of light array 202.

Light imager 208 captures the images at a predetermined frame rate of, e.g., approximately 30 frames/second, i.e., every 1/30 seconds. Therefore, sequential images 216 are spaced in time by a frame period equal to an inverse of the frame rate. Sequential images 216 may be processed in accordance with methods described herein.

Light Communication System Using FSOOK

Figure 3A:
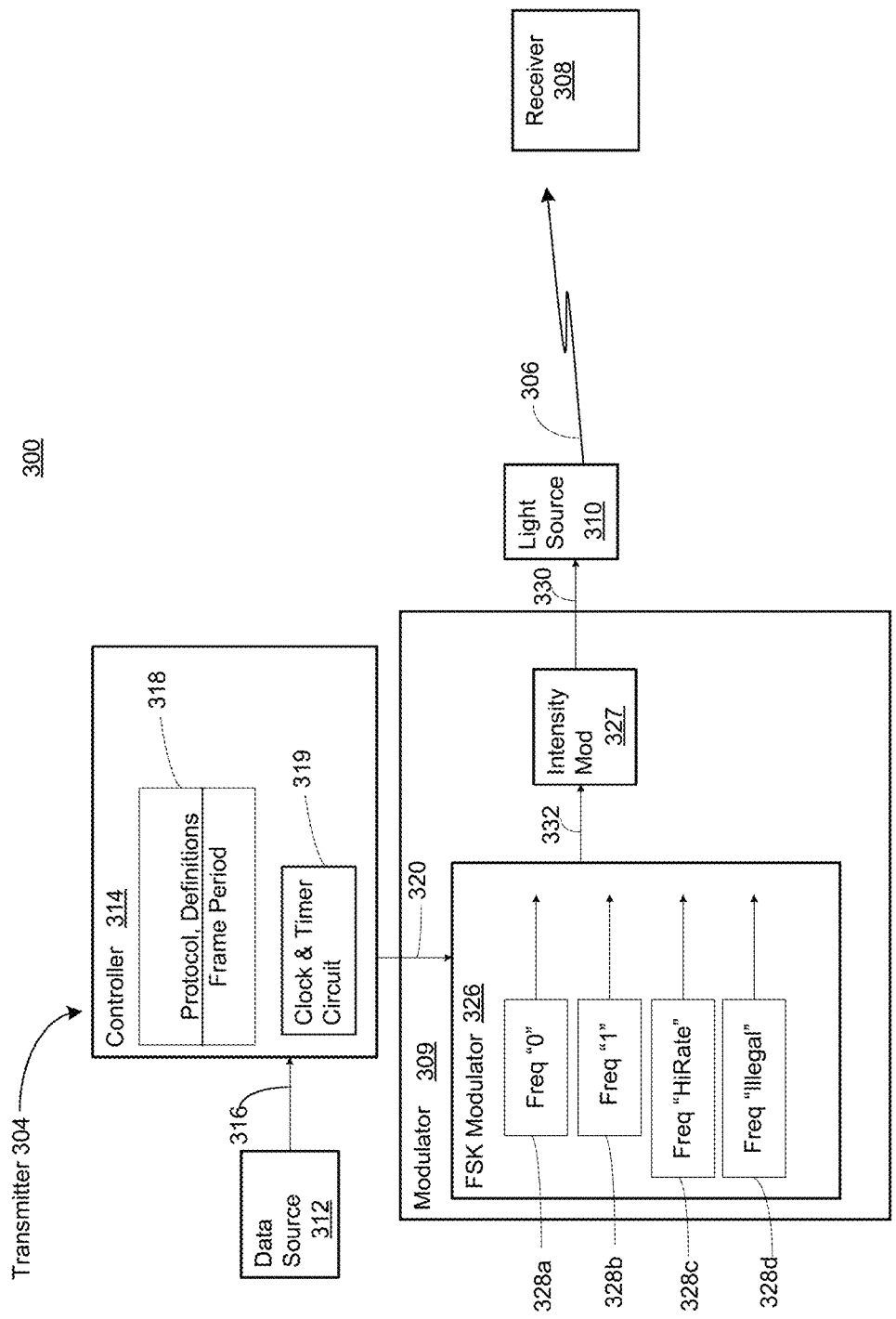
FIG. 3A is a block diagram of an example light communication system and an example light transmitter useful to introduce the principles of frequency shift on-off keying (FSOOK) modulation and detection/demodulation, as it applies to the embodiments described herein.

FIG. 3A is a block diagram of an example light communication system 300 useful to introduce the principles of FSOOK modulation and detection/demodulation. System 300 includes a light transmitter 304 to transmit a FSOOK modulated light beam 306 comprising modulated light packets to a light receiver 308, which detects and demodulates the received light. The FSOOK modulated light beam conveys modulated light packets formatted according to protocol light packet definitions.

Light Transmitter

Light transmitter 304 includes a light modulator 309 to intensity modulate a light source 310, a data source 312, and a controller 314 to control the transmitter. Data source 312 provides data 316, such as a message in the form of data bits, to controller 314. Controller 314 includes a memory 318 to store protocol control logic, protocol light packet definitions, and a frame rate $F_{fps}$ in frames per second, which is equal to the inverse of a frame period $T_{frame}$ in seconds (i.e., $F_{fps}=1/T_{frame}$). The frame rate $F_{fps}$ is an anticipated rate at which light receiver 308 will sample received light, as will be described more fully below in connection with FIG. 3B.

Controller 314 also includes a clock and timer module 319 to generate a master timing signal, and derive from the master timing signal timing outputs used by controller 314 to control transmit light packet start times and durations based on the master timing signal. Based on data 316, the contents of memory 318, and the timing outputs from clock and timer module 319, controller 314 generates commands 320 to cause modulator 309 to modulate light source 310 in accordance with examples described herein.

Modulator 309 includes an FSK modulator 326 and an intensity modulator 327 that together generate a modulation signal 330 to FSOOK modulate light source 310. Controller commands 320 include commands that specify (i) a selected frequency at which FSK modulator is to operate, (ii) a start time at which FSK modulator 326 is to begin generating and outputting the selected frequency, and (iii) a duration (or time period) over which the selected frequency is to be generated. The start time and duration may be graduated in fractions of time period $T_{frame}$, such as 1/1000 of $T_{frame}$. In response to controller commands 320, FSK modulator 326 outputs the selected frequency as an FSK signal 332 beginning at the specified time and duration, such as for an integer number of frame periods, which facilitates detection and demodulation of the frequency at receiver 308. The selected frequencies may include:

a. a first frequency 328a F0 (e.g., 120 Hz) indicative of a logic 0 of a data bit 316 to be transmitted;
b. a second frequency 328b F1 (e.g., 105 Hz) indicative of a logic 1 of the data bit to be transmitted;
c. a third frequency 328c "HiRate" indicative of a first start-frame-delimiter to be transmitted. The HiRate frequency is orders of magnitude greater than frequencies F0, F1, e.g., many KHz or above. An exemplary HiRate frequency is 25 KHz; and
d. a fourth frequency 328d "Illegal" (e.g., 112.5 Hz, i.e., half-way between frequencies F0, F1) indicative of a second start frame delimiter to be transmitted.

FSK modulator 326 may include a voltage, or digitally, controlled oscillator that generates the above frequency responsive to commands 320. The terms "tone" or "tones" and "frequency" or "frequencies" are used equivalently and interchangeably herein.

FSK modulator 326 may generate each of the frequencies F0, F1, HiRate, and Illegal of FSK signal 332 as a substantially rectangular, or ON-OFF keying, waveform, where ON represents a logic 1 of the FSK waveform, and OFF represents a logic 0 of the FSK waveform. Also, to transmit a data bit, each of frequencies F0 and F1 may extend over multiple frame periods, and may be harmonically related to the frame period such that an integer number, k, of ½ cycles or periods of the rectangular FSK waveform matches the frame period, as is depicted in FIG. 4A (described below). More generally:

i. representing a logic 0, frequency $F1=N \times F_{fps}$; and
ii. representing a logic 1, frequency $F1=N \pm 0.5 F_{fps}$, where N is an integer.

Each of the frequencies F0, F1, HiRate, and Illegal, together with the respective number of frames over which they are transmitted, form a light protocol. More specifically, transmitter 304 combines these parameters into the above mentioned modulated light packets formatted in accordance with the light protocol, and then transmits the light packets.

FIG. 4A is an illustration of an example timing diagram of an FSK waveform 404 corresponding to FSK signal 332 in FIG. 3A, where the frame rate $F_{fps}$ is 30 Hz, the bit rate is half the frame rate, i.e., the bit rate is ½ $F_{fps}$=15 bits-per-second, and N=4. Therefore, each data bit has a duration that is two frames periods, i.e., 2×$T_{frame}$. Therefore, to transmit two consecutive data bits, e.g., a logic 0 followed by a logic 1, controller commands 320 cause FSK modulator 326 to generate first an ON-OFF keying waveform 406 at frequency F0 (e.g., 120 Hz=4×30 Hz) for a time period of two frames to represent the logic 0 data bit, and then an ON-OFF keying waveform 408 at frequency F1 (e.g., 105 Hz=3.5×30 Hz) for a period of two frames to represent the logic 1 data bit. The harmonic relationship between frequencies F0 and F1 and the period of two frames is such that (i) waveform 406 at frequency F0 includes eight full cycles, i.e., k=8, during the data bit period, and (ii) waveform 408 at frequency F1 includes seven full cycles or periods, i.e., k=7, during the second data bit period. In other words, over a bit period, eight cycles of FSK signal 332 represent a logic 0, while seven cycles represent a logic 1.

Intensity modulator 327 intensity modulates light source 310 based on the modulation signal 330, to produce modulated light beam 306. Light source 310 may be an LED that emits light in any of the visible, infrared, or ultraviolet light spectrums. In an embodiment, modulation signal 330 follows the shape of FSK signal 332 and adjusts a current through light source 310 to proportionally adjust an intensity of light 306 emitted by the light source. In this manner, ON-OFF keying of modulation signal 330 causes corresponding ON-OFF keying of the intensity of light 306, such that the intensity closely follows ON-OFF keying waveforms 404, 406 depicted in FIG. 4A. Other intensity modulation embodiments are possible, e.g., light source 310 may not be turned off completely during the OFF cycle of the FSK waveform, and so on. For example, a reduced light intensity (e.g., ½ of maximum intensity) from light source 310 may serve as an alternative for the HiRate frequency. Applying a reduced steady state drive current to the light source 310 will cause the light intensity emitted by the light to be correspondingly reduced. Because other such intensity levels are possible, e.g., light source 310 may not be turned off completely, the intensity levels ON, OFF are more generally represented as intensity levels HIGH, LOW.

Transmitter 304 is depicted with one light 310 for simplicity only. Other embodiments include many lights each driven by a corresponding light modulator, as will be described later in connection with FIG. 6.

Transmit Light Packet Definition

FIG. 4B is an illustration of an exemplary light packet definition 450 or light packet protocol for light packets formatted and transmitted by light transmitter 304. According to light packet definition 450, each light packet includes sequential fields of light, beginning with the SFD, which includes light that is intensity modulated at one of the HiRate and Illegal frequencies for multiple, e.g., four, frame periods. Following the SFD, the light packet conveys a series of consecutive, contiguous message bits B1-B10, each of which may be either a logic 0 or a logic 1. Message bits B1-B10 are each conveyed as light that is intensity modulated at the corresponding FSK frequency F0 (for logic 0) or F1 (for logic 1) for two frame periods, i.e., light that is cyclically keyed to multiple intensity levels (e.g., ON, OFF, or HIGH, LOW) at the FSK frequency indicative of the appropriate bit level (i.e., logic 0 or logic 1).

Light Receiver

Figure 3B:
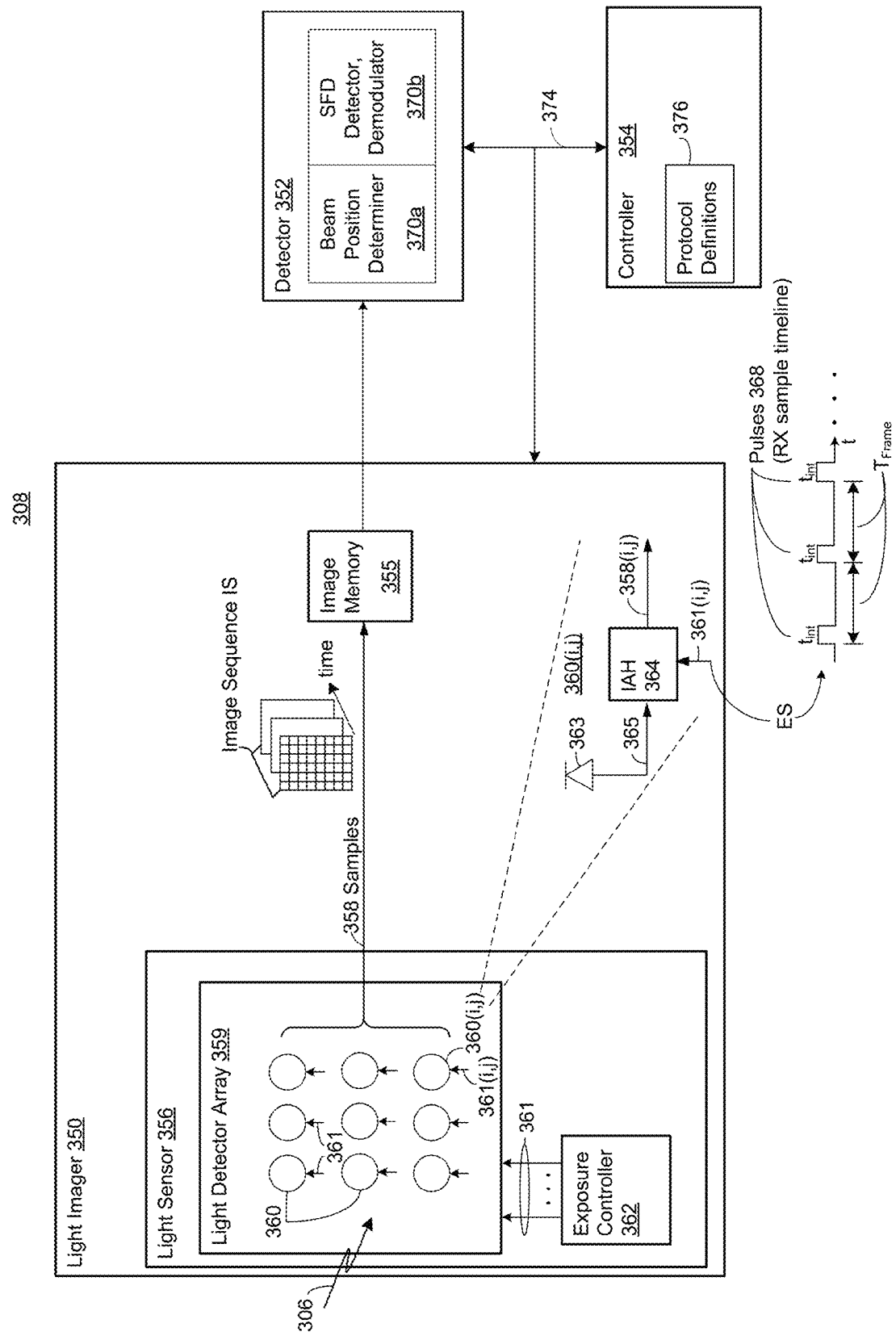
FIG. 3B is a block diagram of a light receiver from FIG. 3A, according to an embodiment.

FIG. 3B is a block diagram of light receiver 308, according to an embodiment. Light receiver 308 receives the modulated light packets conveyed in modulated light beam 306. In embodiments, light receiver 308 will receive many spatially-separated modulated light beams simultaneously. Light receiver 308 includes a light imager 350 (also referred to as an imager 350) to sample and record received modulated light packets in light beam 306 as images, a detector 352 to detect and demodulate the fields of modulated light in the light packets recorded in the images, and a controller 354 to control the receiver and process the recorded images as described in one or more examples herein.

Imager 350 includes a light sensor 356, e.g., including a 2-dimensional array of light detectors, that repetitively samples light impinging on the light sensor at a predetermined receive sample rate equal to the frame rate, $F_{fps}$=1/$T_{frame}$, of imager 350 to produce a signal 358. Signal 358 includes a time-ordered sequence of 1-dimensional, or alternatively, 2-dimensional light samples, which form images of an image sequence IS (similar to images 216 depicted in FIG. 2). In other words, the images are formed from the light samples. Accordingly, signal 358 is referred to in terms of both "light samples 358" and "images 358" interchangeable and equivalently. Imager 350 records images 358 in an image memory 355 of the imager.

Light Detector Array

Light sensor 356 may include a 2-dimensional light detector array 359, such as a CCD array, including multiple individual light detectors 360 (also referred to as sensor pixels 360) spatially arranged in M rows by N columns, where M and N may each be in the hundreds or thousands. For convenience, exemplary light detector array 359 is depicted in FIG. 3B as having only 3 rows by 3 columns of light detectors 360. Each of light detectors 360 receives a corresponding one of multiple enable signals 361 generated by an exposure controller 362 of light sensor 356. Enable signals 361 cause light detectors 360 to sample light in a controlled manner, to produce light samples 358 (forming the images), which may be digitized light samples, as will be described more fully below.

An exemplary individual light detector 360(i, j) is depicted in expanded view in FIG. 3B at the bottom right-hand side of the imager block 350. Descriptors (i, j) indicate the row (i) and column (j) positions in array 359, where i=1 . . . M, j=1 . . . N. Light detector 360(i, j) includes a photo-detector 363 followed by an integrate-and-hold (IAH) circuit 364. Photo-detector 363 converts light energy 306 impinging thereon into an electrical signal 365 having a magnitude that follows or represents the intensity of the light energy.

IAH circuit 364 operates as an approximated matched filter to recover samples of the FSK light waveform pulses, such as the pulses of waveforms 406, 408, in the light packets of light beam 306. IAH circuit 364 integrates electrical signal 365 for an integration time $t_{int}$ according to enable signal 361(i, j), to produce a peak integrated signal, also referred to herein as light sample 358(i, j) or sampled light 358(i, j), which is held at the output of the IAH circuit. The process of enabling light detector 360(i, j) to sample light 306 in accordance with enable signal 361(i, j), to produce light sample 358(i, j), is also referred to herein as "exposing light detector 360(i, j), to produce light sample 358(i, j)." Integration time $t_{int}$ may be approximately a half-period or less of the waveforms of frequencies F0, F1, so that light detector 360(i, j) approximately maximally samples light that is intensity modulated at frequencies F0, F1 of FSK waveforms 406, 408 (for logic levels 0, 1).

An exemplary enable signal waveform "ES" of enable signal 361(i, j) is depicted at the bottom of FIG. 3B. Enable signal 361(i, j) (e.g., waveform ES) may include a series of enable pulses 368 spaced in time from each other by frame period $T_{frame}$, i.e., the enable pulses have a pulse repetition rate equal to the frame rate $F_{fps}=1/T_{frame}$ of image sensor 356. Each of enable pulses 368 has a pulse width equal to $t_{int}$ to enable IAH circuit 364 to integrate energy over the pulse width, and hold peak integrated signal 358(i, j) at the output until a next pulse in the series of pulses causes the IAH to resample its input. Enable pulses 368 establish and represent a receive sample timeline of light receiver 308. In this way, light detector 360(i, j) samples light energy 306 impinging on position (i, j) of light detector array 359 at frame rate $F_{fps}$, to produce sampled light energy as a series of light samples represented at 358(i, j) coinciding with pulses 368. Each of light detectors 360 may simultaneously sample light energy 306, to produce simultaneous light samples 358(1-M, 1-N) represented in signal 358.

Global and Line Array Exposure Modes

Exposure controller 362 generates enable signals 361 in any number of ways to implement different exposure modes of light detector array 359, as is now described.

Exposure controller 362 may expose array 359 (i.e., enable light detectors 360 to sample light 306 in accordance with enable signals 361, to produce light samples 358) in either a global exposure mode or, alternatively, in a sequential line exposure mode. In the global exposure mode, exposure controller 362 generates enable signals 361 so that their respective series of enable pulses 368, i.e., respective integration periods $t_{int}$, coincide in time with each other, i.e., occur at the same time. The result is that all of light detectors 360 are exposed at the same time, i.e., they all sample light 306 at the same time, once every frame period $T_{frame}$, to produce a time-spaced sequence of 2-D images represented in images 358 (which represents all light samples 358(i, j), i=1 . . . M, j=1 . . . N), as represented in FIG. 3B by image sequence IS. Each image in the sequence of images IS includes a 2-D array of light samples corresponding to the 2-D array of light detectors 360.

In the line exposure mode, exposure controller 362 may generate enable signals 361 to expose spatially-successive lines, e.g., successive rows or successive columns, of light detectors 360 one after the other, e.g., one at a time, in a time sequence. For example, exposure controller 361 may generate enables signals 361 so as to expose:

a. all of light detectors 360 across row i−1 (i.e., all of the N light detectors 360(i−1, 1−N)) at a same time t−τ; then
b. all of light detectors 360 across row i at a same time t; then
c. all of light detectors 360 across row i+1 at a same time t+τ, and so on.

This produces spatially-successive lines of sampled light, spaced in time at sequential times t−τ, t, t+τ, corresponding to light detector rows i−1, i, i+1, and so on. This type of exposure is also referred to as "rolling shutter exposure" because the exposure may be thought of as being implemented using a camera shutter one line of light detectors wide (i.e., that is only wide enough to expose one line of light detectors at a time), that "rolls" or scans sequentially across spatially-successive lines (e.g., the rows or columns) of light detectors in a given direction (e.g., up/down, left/right), to thereby sequentially expose the spatially-successive lines of light detectors. In an embodiment, exposure controller 362 sequentially exposes the spatially-successive lines of light detectors at a rate (referred to as a "line exposure rate") that is greater than both frequencies F0, F1 of the FSK waveforms representing logic levels 0, 1 in transmitted light packets. The line exposure rate is equal to 1/τ.

In a variation of the above-described line exposure mode, the enable signals 361 may be generated to be slightly offset in time but overlapping, so that the exposure of each line time-overlaps the exposure of the spatially-successive line. For example, row i−1 begins its exposure at a time $t_{i-1}$, and while being exposed (e.g., before time $t_{int}$ expires for row i−1), row i begins its exposure, and while being exposed (e.g., before time $t_{int}$ expires for row i), row i+1 begins its exposure, and so on. This variation of the line exposure mode results in time spaced lines of sampled light corresponding to light detector rows i−1, i, i+1, but with overlapping exposure times for successive rows.

Figure 3C:
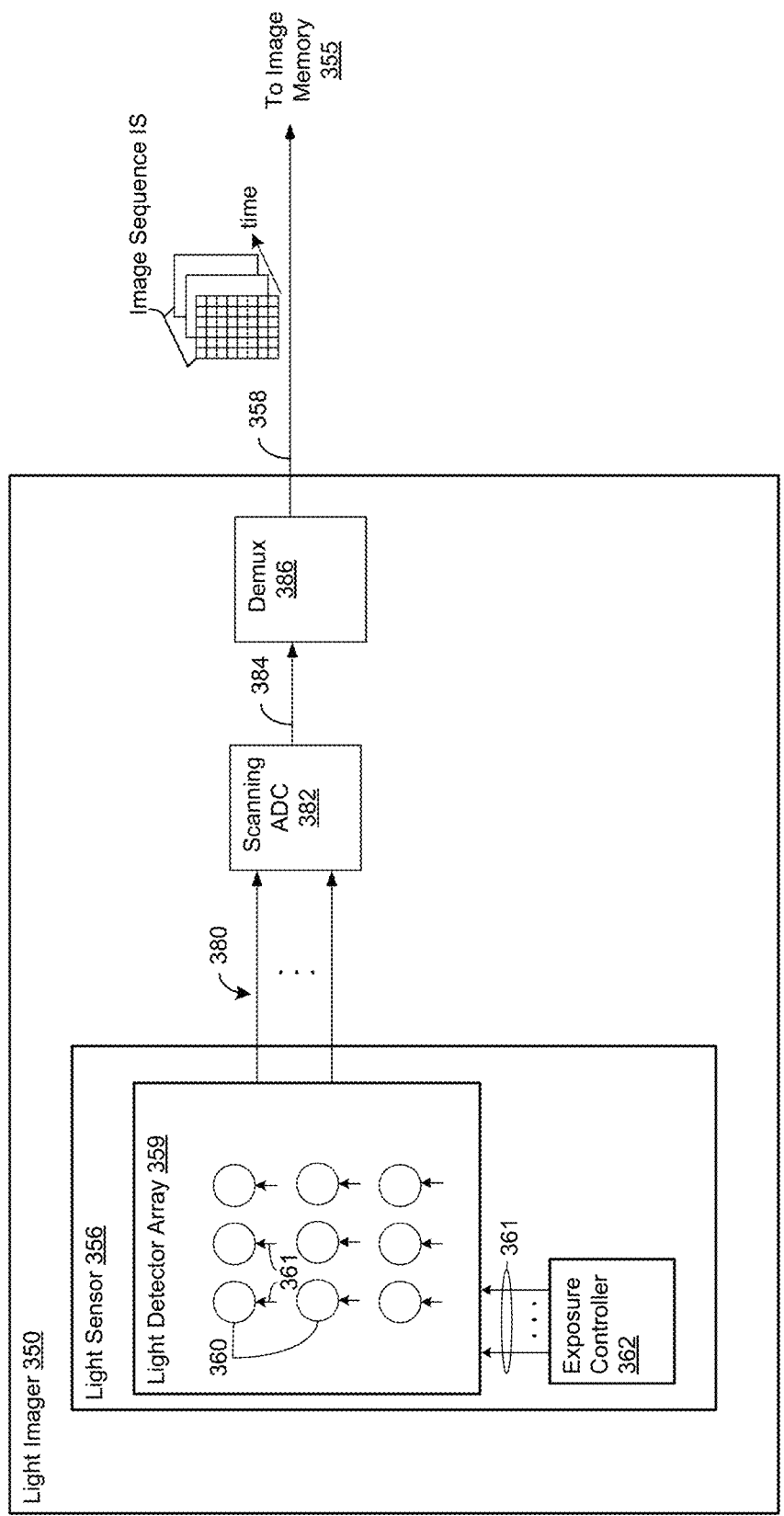
FIG. 3C is a block diagram of a light imager including light sample digitizing modules, according to an embodiment.

FIG. 3C is a block diagram of light imager 350 including light sample digitizing modules, according to an embodiment. Light detectors 360 provide corresponding sampled outputs 380 to a light detector (or pixel) scanning analog-to-digital converter (ADC) 382 that sequentially scans across each of the light detectors and digitizes its corresponding sampled output, to produce sequential, digitized sampled outputs 384. A demultiplexer 386 converts the sequential, digitized sampled outputs into an array of digitized, sampled outputs representative of images 358. Use of scanning ADC 382 and demultiplexer 386 reduces the number of ADCs that might otherwise be required to digitize all of the sampled outputs 380 in parallel.

Detector

Detector 352 includes a beam position determiner module 370a, and a SFD detector/demodulator module 370b (collectively referred to as "modules 370" and "modules 370a, 370b"), which cooperate to process the sequence of images stored in memory 355, namely to:

a. determine a position of each beam recorded in the images, such as an x, y center coordinate of the beam in each image (using beam position determiner 370a); and
b. from the modulated light recorded at the determined beam positions, both detect any delimiters (SFDs) and demodulate any data bits conveyed by that recorded light (using detector/demodulator 370b).

As described above, light detectors 360 sample FSK waveform pulses in light 306, such as the pulses of waveforms 406, 408 at frequencies F0, F1 (representing logic levels 0, 1), and provide the resulting samples 358 to modules 370a, 370b, e.g., in a sequence of 1-dimensional or 2-dimensional images IS.

To detect a beam position, beam position determiner 370a raster scans the full area of each image in the sequence of images (e.g., in image sequence IS) stored in memory 355, e.g., first, second, third, and fourth sequential images, and so on, in search of recorded light energy that has a correlated position across the sequence of images. In other words, a beam position is determined when beam position determiner 370a detects a spot of modulated light, i.e., modulated light energy, centered on the same position, e.g., an x, y position corresponding to a row, column position, in each of the sequential images. Beam positions for multiple, spatially-separated, simultaneously recorded beams may be determined in this manner.

From each determined position, SFD detector/demodulator 370b associates corresponding light samples 358, over multiple recorded images, to one of: a demodulated data bit level, i.e., logic 0 or logic 1; a demodulated data delimiter; and a detected SFD.

Figure 5:
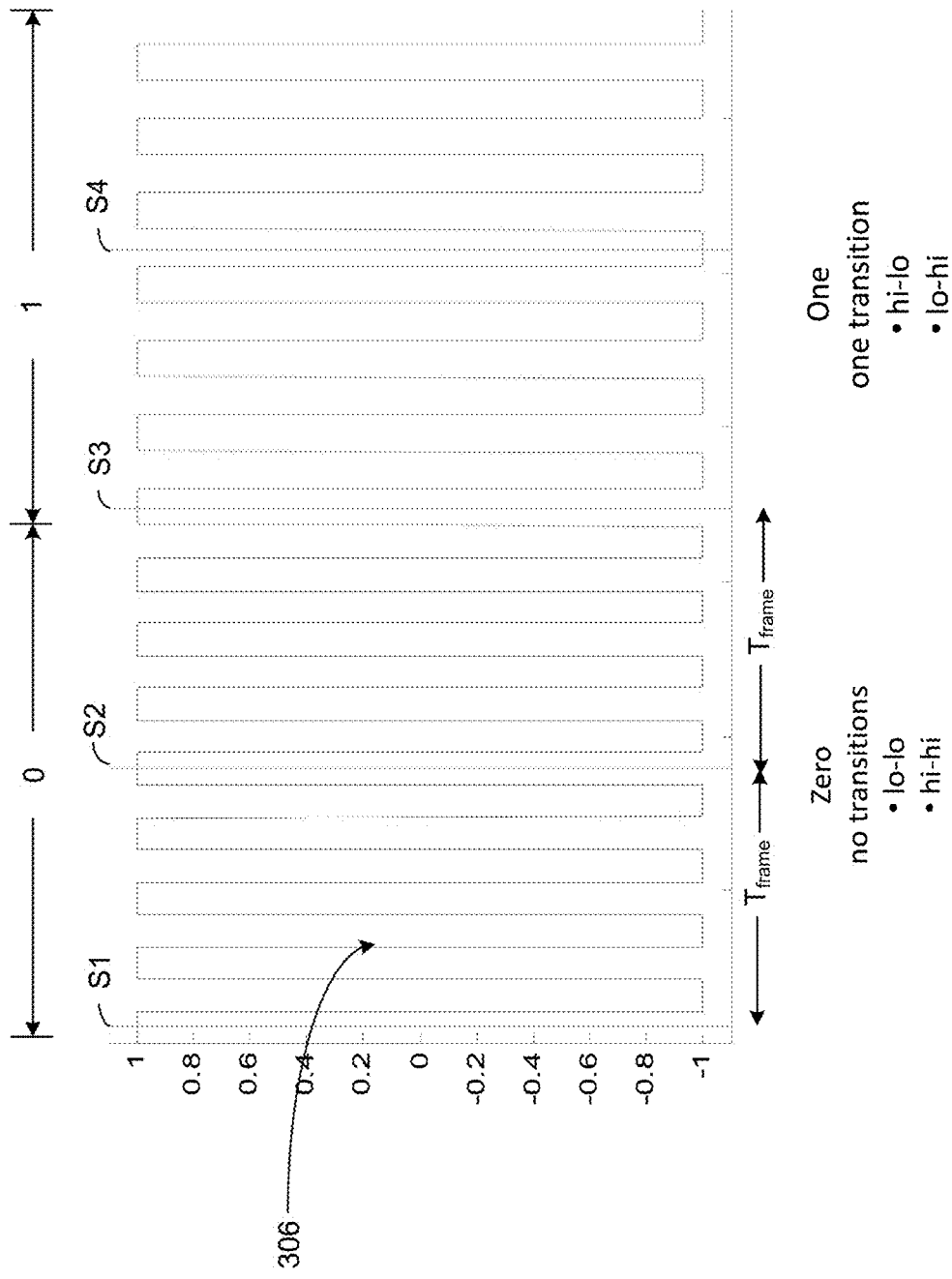
FIG. 5 is a light amplitude/intensity vs. time diagram helpful in understanding how a light receiver detector/demodulator of FIG. 3B associates light samples with demodulated data bits.

FIG. 5 is a light amplitude/intensity (y-axis) vs. time (x-axis) diagram helpful in understanding how SFD detector/demodulator 370b associates light samples 358 with demodulated data bits. In the example of FIG. 5, exemplary light signal 306 conveys a logic 0 followed by a logic 1, i.e., the light is intensity modulated at FSK frequencies F0 and F1 for first and second bit periods, i.e., where each bit period is twice frame period $T_{frame}$. On the diagram of FIG. 5, light intensity values of 1, −1 correspond to light intensity values of ON, OFF, (or HIGH, LOW) respectively. Assuming light 306 impinges on a given one of light detectors 360, then that light detector samples light 306 once every frame period $T_{frame}$ (i.e., twice per bit period), in accordance with a receiver sample timeline, to produce a sequence of time-spaced light samples S1, S2, S3, and S4, with an arbitrary sample phase relative to the bit periods. If light 306 is sampled once per frame period while the FSK waveforms at frequencies F0, F1 may produce 3 or 4 full cycles per frame period, the FSK waveforms are under-sampled compared to the Nyquist rate, i.e., two samples per FSK waveform cycle.

During the first bit, or logic 0, period, the frequency/timing relationship between the 120 Hz ON-OFF keying of light 306 and the light sample spacing, i.e., the frame period $T_{frame}$, causes consecutive light samples S1 and S2 to be in the same intensity state, i.e., at the same level (either ON/HIGH). In the example of FIG. 5, consecutive samples S1 and S2 are both ON. However, the absolute level, e.g., ON or OFF, depends on the sample phase of the receiver sample timeline. Therefore, if two consecutive light samples indicate consecutive same ON-ON or OFF-OFF states, then detector/demodulator 370b associates this condition with, and demodulates, a logic 0.

During the second bit, or logic 1, period, the frequency/timing relationship between the 105 Hz ON-OFF keying of light 306 and the light sample spacing causes successive light samples S3 and S4 to toggle between states either (ON then OFF, or OFF then ON). In the example of FIG. 5, consecutive samples S3 and S4 transition from ON to OFF. However, in other examples, with different sample phases of the receiver sample timeline, S3 and S4 may toggle from OFF to ON. Therefore, if two consecutive light samples indicate a state transition ON-OFF or OFF-ON, then detector/demodulator 370b demodulates a logic 1.

The above-described exemplary demodulation of FSOOK modulated light is based on under-sampling the FSK waveform. Therefore, such demodulation is referred to herein as under-sampled FSOOK (UFSOOK) demodulation.

Modules 370a, 370b also monitor light samples (i.e., images) 358 to detect light modulated with the Illegal frequency, as an indicator of a SFD associated with a light packet. As mentioned above in connection with demodulated data bits, the relationships between the frame period and the frequencies F0, F1 respectively causes detected light in two consecutive images always to be either in the same state, or in different states. However, the relationship between the frame period and the Illegal frequency causes detected light to toggle ON and OFF over four consecutive images in an ON-OFF pattern that cannot occur when the light is modulated at frequencies F0, F1. More specifically, if the light samples indicate any of patterns ON-ON-OFF-OFF, OFF-OFF-ON-ON, ON-OFF-OFF-ON, and OFF-ON-ON-OFF over four consecutive images, then modules 370a, 370b detect the Illegal frequency associated with the data delimiter.

Modules 370a, 370b also monitor light samples 358 to detect light modulated with the HiRate frequency, as an indicator associated with the SFD. An SFD modulated at the HiRate frequency may be more readily detected relative to an SFD modulated at the Illegal frequency when embedded with message data bits (e.g., logic 0, 1) because the HiRate frequency is more easily distinguished from the logic 0, 1 FSK frequencies than the Illegal frequency, which falls between those frequencies.

While light detectors approximately maximally detect frequencies F0, F1 in the modulated light, i.e., produce a near maximum amplitude output in response to the matched frequency, the integration time of the light detectors is too long to respond fully to the much greater HiRate frequency. Therefore, light detectors 360 are suboptimal energy detectors/samplers of the HiRate frequency, and provide an average, e.g., approximately ½ maximum, amplitude output (i.e., sampled output) in response to the HiRate frequency. Therefore, modules 370a, 370b detect the SFD in modulated light beam 306 when light detectors 360 provide the average, lesser amplitude outputs in response to sequential images. Similarly, in a transmit embodiment in which a reduced light intensity serves as an alternative for the HiRate frequency, light detectors 360 provide an average, lesser amplitude indicative of the reduced light intensity.

From recorded sampled light at a determined position in a sequence of images, modules 370a, 370b demodulate frequencies F0, F1 into data bit logic levels, detect the HiRate frequency, and detect the Illegal frequency associated with the SFD. Modules 370a, 370b also detect the number of frames over which each of the above mentioned frequencies extend. In this way, detector 352 deconstructs or determines the modulated light packets conveyed in the recorded light beam(s). Modules 370a, 370b pass such information to controller 354 over a bidirectional interface 374. For example, over interface 374, modules 370a, 370b indicate detected SFDs from recorded light packets to controller 354, and provide demodulated data bits from the light packets to the controller.

Controller

Controller 354 (also referred to herein as a "protocol processor") includes a memory 376 to store control logic protocol light packet definitions, and a frame period. Controller 354 provides light packet protocol definitions to detector 352 over interface 374. Based on the information from detector 352 and the contents of memory 376, controller 354 operates and controls receiver 308. Controller 354 also controls imager 350 over interface 374, e.g., the controller may command exposure controller 363 to operate in either of the global exposure mode or the line exposure mode.

Multi-Light Transmitter

Figure 6:
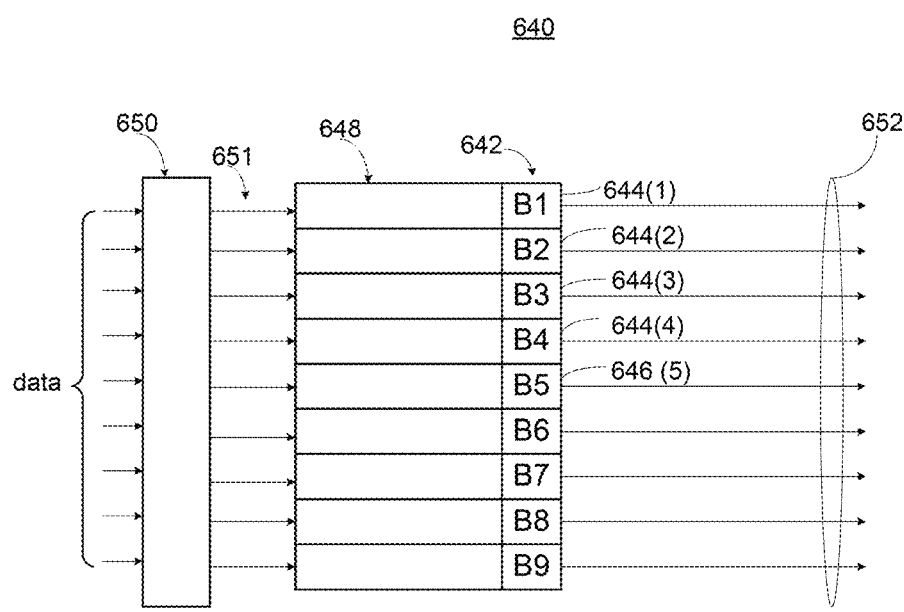
FIG. 6 is a block diagram of an example multi-light transmitter to transmit light packets.

FIG. 6 is a block diagram of an example multi-light transmitter 640 to transmit light packets. Light transmitter 640 includes an array or group of spatially-separated lights 642, which may be spatially-arranged in either 1-dimension or in 2-dimensions.

Transmitter 640 includes light modulators 648, which may be implemented similarly to modulator 309 in FIG. 3, each to modulated light from a corresponding one of lights 642. Transmitter 640 may include a controller 650, including memory and one or more clock and timer circuits similar to those of controller 314. Controller 650 receives multiple parallel data inputs (e.g., one per light modulator) from data sources not shown, and generates modulator commands 651 in parallel to control multiple modulators 648, similar to the manner in which commands 320 control modulator 309. In an alternative embodiment, controllers, such as controller 314, may be incorporated into each of modulators 648 separately.

In response to commands 651, modulators 648 modulate their corresponding lights 642 to transmit their respective light packets in spatially-separated light beams 652 according to the light packet definition of FIG. 4B, to convey data bits received over the data inputs. In response to commands 651, modulators/lights 648/642 may transmit their respective light packets with any number of different inter-packet timing relationships. For example, modulators/lights 648/642 may transmit their respective light packets simultaneously with each other. Alternatively, the light packets may be transmitted in a serial manner, one after the other. Alternatively, the light packets may be transmitted with their respective start times offset slightly with respect to each other. Any combination of such inter-packet timing relationships is possible.

In an alternative embodiment, some of lights 642 may modulate their respective light beams, while others may transmit unmodulated light beams.

Implicit Photogrammetric Position Determination

Implicit photogrammetric position determination of light receiver relative to a light transmitter is now described.

Figure 7:
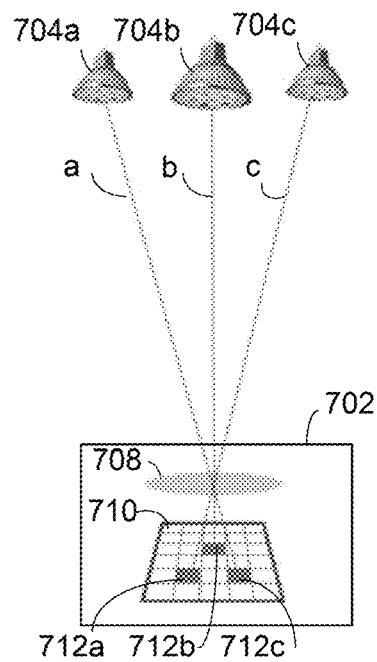
FIG. 7 is a light diagram useful to introduce the principles of photogrammetric position determination of a light receiver.

FIG. 7 is a light diagram useful to introduce the principles of photogrammetric position determination of a light receiver 702. Spatially-separated lights 704a, 704b, and 704c of a light array transmit respective spatially-separated light beams a, b, and c to light receiver 702, which includes an imaging lens 708 and a light sensor 710. Light beams a, b, c project through lens 708 onto light sensor 710, and illuminate light detectors (or sensor pixels) at spatially-separated positions 712a, 712b, 712c. The relationship between positions 712a, 712b, 712c and a focal point of lens 708 forms multiple triangles having vertices at lights 704 and light receiver 702. Assuming that real-world positions, e.g., <x, y, z> coordinates, for lights 704 and their corresponding image/sensor positions 712 are known, a real-world position of lens 708 relative to the positions of lights 704 may be determined based on the triangles. Therefore, a real-world position of light receiver 702 relative to lights 704 may be determined. This is referred to as photogrammetric position determination (or positioning), as would be appreciated by those of ordinary skill in the relevant arts. Photogrammetric equations are provided below and described in connection with FIG. 14.

Photogrammetric position determination requires knowledge of both the real-world position and the corresponding image positions of the lights upon which the determination is based. Each light is associated with two positions, namely, its real-world position and its corresponding image position. The real-world positions may be ascertained explicitly in explicit photogrammetric positioning, or implicitly in implicit photogrammetric positioning. In the explicit approach, each light transmits modulated light to indicate a unique light identifier. The light receiver recovers the IDs from the modulated light, and then retrieves real-world positions of the lights from a database of light positions, e.g., <x, y, z> coordinates, indexed by the IDs. In this way, the real-world light positions are said to be explicitly determined because all of the lights provide their IDs explicitly, from whence their positions in the database may be accessed/determined.

In the implicit approach, while some of the lights transmit their IDs, others do not. For example, some of the lights may transmit constant intensity, unmodulated light. Such lights do not explicitly provide their IDs. Therefore, their IDs, and associated real-world positions, must be inferred implicitly.

Figure 8:
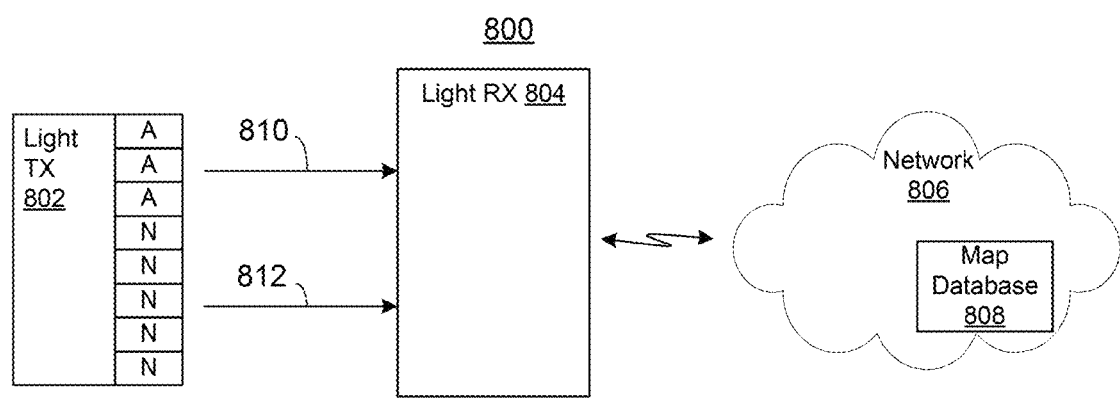
FIG. 8 is a system for implicit photogrammetric position determination, according to an embodiment.
Figure 10B:
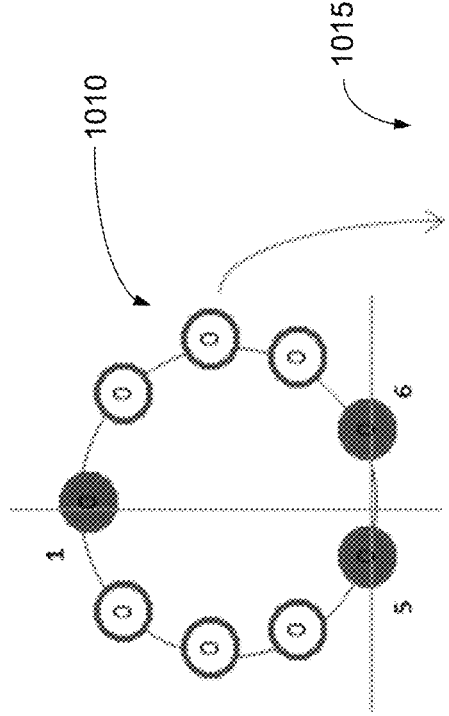
FIG. 10B is an illustration of yet another light map and its associated light position table.
Figure 10A:
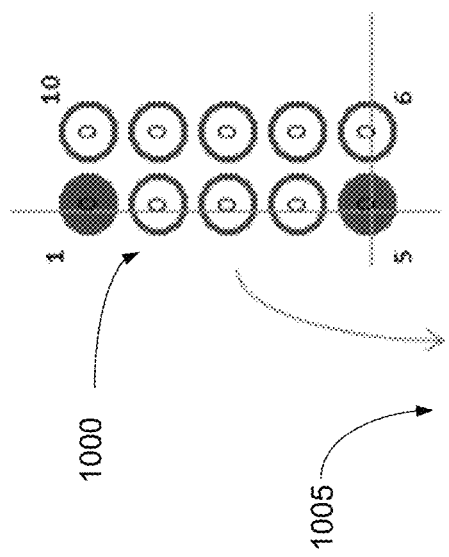
FIG. 10A is an illustration of another light map and its associated light position table, which may be stored in a light map database.

FIG. 8 is a system 800 in which implicit photogrammetric position determination may be performed, according to an embodiment. System 800 includes a light transmitter (TX) 802 to transmit light to a light receiver 804, which communicates in turn with a network 806, which may include the Internet. A light map database 808 may reside on a cloud-based server accessible through network 806. Light map database 820 stores predetermined light maps (also referred to as "reference light images"), each map representing a reduced-scale spatial arrangement of lights of an actual, deployed (real-world) light array. The lights depicted in the light maps are referred to as "map lights." The light maps may be indexed, or addressed, by one or more unique light IDs of the lights depicted in the light maps (and deployed in the light arrays). The light maps associate their depicted lights (i.e., map lights) with (i) matching light IDs, and (ii) their real-world positions (e.g., <x, y, z> coordinates) in deployed light arrays, e.g., in buildings, such as a shopping mall. Accordingly, access to a light map also provides access to, and indicates, the IDs of the lights depicted in the map and their corresponding real-world positions. Examples of light maps and their associated information are depicted in FIGS. 10A and 10B, described below.

Returning to FIG. 8, light transmitter 802 and light receiver 804 may be configured to operate similarly to multiple light transmitter 640 and light receiver 308, respectively. Light transmitter 802 includes multiple spatially-separated lights A to transmit spatially-separated light beams 810, each FSOOK modulated to indicate an SFD and a unique light ID, e.g., as described in light packet definition 450 of FIG. 4B, where the light ID may comprise some or all of the series of bits B1-B10. For example, bits B1 through B5 may be designated as light ID bits to carry an exemplary light ID "00011." Lights A and their modulated light beams 810 are referred to herein as "anchor lights" or "modulated lights" and "anchor light beams" or "modulated light beams," respectively. Light transmitter 802 also includes multiple spatially-separated lights N to transmit spatially-separated unmodulated light beams 812. Lights N and their unmodulated light beams 812 are referred to herein as "non-anchor lights" or "unmodulated lights" and "non-anchor light beams" or "light beams," respectively.

Light receiver 804 samples and records spatially-separated anchor light beams 810 and non-anchor light beams 812 in a sequence of recorded images representing lights A, N of light transmitter 802. Light receiver determines positions (i.e., image positions) of the recorded anchor light beams and the non-anchor light beams in the recorded images. Light receiver 804 detects the unique light IDs from each of the recorded anchor light beams 810 using, e.g., UFSOOK demodulation. Using the detected light IDs as an index into map light database 808, light receiver 804 accesses/retrieves the light map that depicts anchor lights A associated with the detected anchor light IDs, i.e., a light map of lights A, N as positionally arranged in transmitter 802. In an alternative embodiment, light map database 808 may be stored in a local memory of light receiver 804, i.e., the light maps are collocated with the light receiver. In such an embodiment, the light receiver simply accesses its local memory for the relevant light map.

Light receiver 804 rotates and scales the retrieved light map as necessary so as to align the map anchor lights with their counterpart recorded anchor lights (i.e., recorded anchor light beams) in the recorded images. The map anchor lights are aligned with the recorded anchor lights having the same light ID. This also aligns the light map non-anchor lights with their counterpart non-anchor lights (i.e., non-anchor light beams) in the recorded images. The result is aligned pairs of map lights and recorded lights (i.e., light beams), each pair associated with a unique light ID and corresponding real-world position linked to the light map. Therefore, the aligned light map indicates the real-world positions of the lights A, N.

Light receiver 804 photogrammetrically determines a 3-dimensional position of the light receiver relative to light transmitter 802 based on (i) the real-world positions of the lights A, N ascertained from the aligned light map, and (ii) the already known positions of the recorded light beams in the recorded images. This is referred to as implicit photogrammetry because the light IDs and real-world positions of the non-anchor lights N were inferred from the aligned light map. The photogrammetric position determination may be performed in accordance with the equations described below in connection with FIG. 14.

Figure 9A:
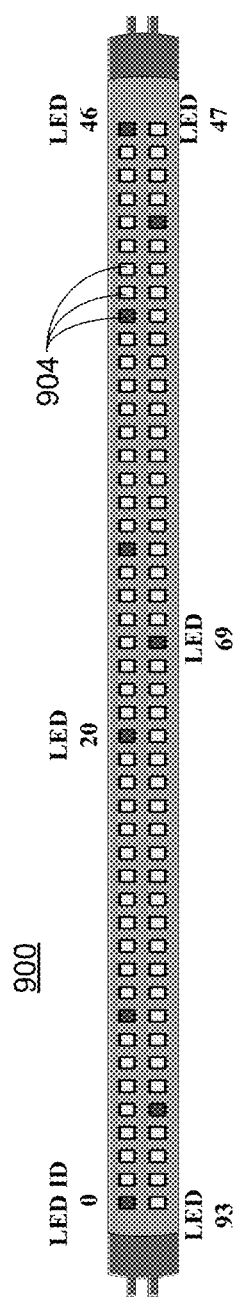
FIG. 9A is a diagram of an example transmit light array and corresponding light map that may be used in implicit photogrammetric determination.

FIG. 9A is a diagram of an example transmit light array 900, and its corresponding light map, that may be used in implicit photogrammetric determination. Light array 900 includes an array of 94 LEDs 904 (each depicted as a small square) spatially arranged in 2-dimensions to cover a shape of a standard fluorescent tube. LEDs 904 are indexed by increasing LED ID 0-93. The indexing is arbitrary and could be reordered any number of ways. The dark colored LEDs (i.e., dark squares) are modulated LEDs, i.e., anchor LED that transmit their IDs as FSOOK modulated light, while the light colored LEDs (i.e., light squares) are unmodulated LEDs, i.e., LEDs that transmit constant intensity light.

Light map database 808 stores the light map depicted in FIG. 9A corresponding to light array 900. In response to a request for a light map from light receiver 804 that contains, e.g., detected anchor LED IDs 20, 69, database 808 returns the light map, or a portion thereof, of light array 900. In other words, the request for the light map provides detected anchor LED IDs 20, 69 as an index to the correct light map to be returned. Database 808 returns the light map, or portion thereof, that depicts map anchor lights with IDs 20, 69, as well as other non-anchor map lights in the vicinity of the indexed anchor lights.

Figure 9B:
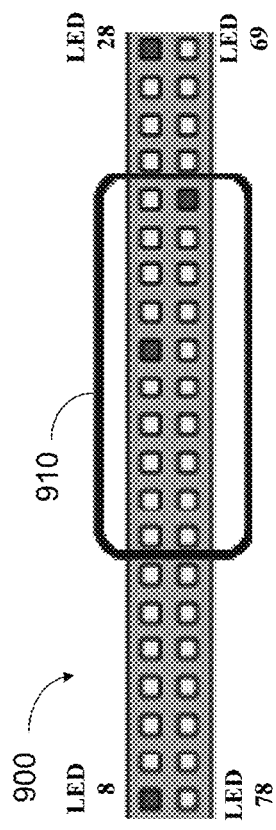
FIG. 9B is an illustration of a map portion of the light map from FIG. 9A, that may be returned to a light receiver in response to a request indexed by anchor light identifiers.

FIG. 9B is an illustration of a map portion 910 of the light map of light array 900 that may be returned to light receiver 804 in response to the request indexed by anchor LED IDs 20, 69. Portion 910 depicts (i) map anchor LEDs 20, 69, and (ii) map non-anchor LEDs in the vicinity of the anchor LEDs.

Figure 9C:
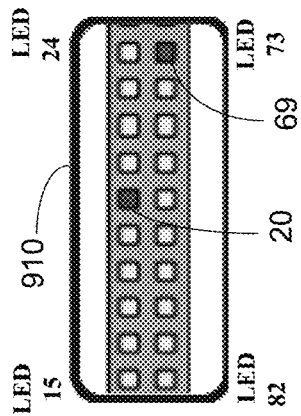
FIG. 9C is an illustration of the map portion from FIG. 9B that is returned to the light receiver.

FIG. 9C is an illustration of map portion 910 returned to light receiver 804. Associated with each light ID in map portion 910 is a real-world light position (not shown in FIG. 9C), which is accessible to light receiver 804. Once receiver 804 retrieves map portion 910, the light receiver rotates and scales retrieved map portion 904 to positionally align the (scaled, rotated) map anchor LEDs 20, 69 with their counterpart recorded anchor light beams in the images from which the IDs 20, 69 were detected. This also aligns the map non-anchor LEDs with their counterpart recorded non-anchor light beams. Light IDs and real-world positions associated with the light IDs for all of the aligned light beams are then accessible.

FIG. 10A is an illustration of another light map 1000 and its associated light position table 1005, which may be stored in light map database 808. The light map 1000 and light position table 1005 may be returned to a requesting light receiver upon request. The light position table 1005 lists light IDs and their corresponding real-world positions in <x, y, z> coordinates. The anchor LEDs have IDs 1 and 5. Therefore, a light map request naming anchor light IDs 1, 5, would result in light map 1000 and light position table 1005 being returned.

FIG. 10B is an illustration of another light map 1010 and its associated light position table 1015, which may be stored in map database 808. The anchor LEDs have IDs 1, 5, and 6. Assuming light receiver 804 receives light from a light array corresponding to light map 1010, the light receiver would detect anchor light IDs 1, 5, 6.

In connection with FIG. 10B, the receiver transmits the following message to map database 808 requesting a light map indexed by the detected (i.e., observed) anchor IDs:
Observed_Anchor_IDs,[number observed (3)],[Anchor IDs (1,5,6)]

In response, the server storing light map database 808 returns light map 1010 along with the following information:
Map
[number of light anchors in map (3)], [Anchor ID numbers (1,5,6)], [Light Anchor locations <x1,y1,z1>,<x5,y5,z5>,<x6,y6,z6>],
[number of non-anchor lights in the map (6)],[non-anchor ID numbers (2,3,4,7,8,9)],[non-anchor light locations <x2,y2,z2>,<x3,y3,z3>,<x4,y4,z4>,<x7,y7,z7>,<x8,y8,z8>,<x9,y9,z>]

Many different positional arrangements of anchor lights are possible. Preferably, the anchor lights are arranged in the light array and corresponding light map so as to be rotation invariant, which avoids alignment ambiguities.

Method Flowchart

FIG. 11 is a flowchart of an example method 1100 summarizing implicit photogrammetric position determination of a light receiver relative to a light transmitter.

1105 includes, in a light receiver, sampling and recording spatially-separated, modulated anchor (i.e., modulated) light beams from anchor (i.e., modulated) lights and non-anchor (i.e., unmodulated) light beams from non-anchor (i.e., unmodulated) lights of a light array, to produce a sequence of images of the light array. The light receiver may be a camera that "shoots" a short video of the light array, to produce the sequence of images. In an embodiment, the anchor light beams each comprises light modulated to indicate an SFD, followed by a unique light ID that is a series of bits, such as "0110," etc., each bit represented as light that is intensity modulated, e.g., FSOOK modulated, over a bit period at one of multiple FSK frequencies indicative of the bit. The non-anchor light beams are unmodulated.

1110 includes determining positions in the images where the modulated anchor light beams are recorded, and then demodulating, from the determined positions, the light IDs from the recorded anchor light beams. The demodulating may include UFSOOK demodulating the recorded anchor light beams.

1115 includes accessing a predetermined light map of the light array based on the demodulated light IDs. Such accessing may include transmitting, to a light map database residing in a network, a request for the light map of the light array containing lights having the demodulated light IDs, and receiving the requested light map and real-world light positions (e.g., in a table) associated with the lights in the light map.

In an embodiment, the light map defines a spatial arrangement of map anchor lights and map non-anchor lights that matches a reduced-scale spatial arrangement of the anchor lights and the non-anchor lights in the light array. The map anchor lights may be specifically annotated in a manner detectable by the light receiver to facilitate alignment therewith, as described below. Associated with the light map is a table listing light IDs of the map lights in association with their corresponding real-world positions, e.g., <x, y, z> coordinates, in the light array, as deployed.

1120 includes positionally aligning the light map with the recorded anchor light beams. That is, positionally aligning the map anchor lights with recorded anchor lights having the same IDs (i.e., where the detected IDs match the map light IDs returned from the map light database). Positionally aligning may include rotating and scaling the retrieved light map so as to positionally align the map anchor lights with their corresponding recorded anchor lights.

1125 includes accessing real-world positions of the anchor and the non-anchor lights of the light array based on the aligned map, which implicitly indicates the IDs and corresponding real-world positions of the recorded non-anchor light beams.

1130 includes photogrammetrically determining a 3-dimensional, position of the light receiver relative to the light array based on the real-world light positions accessed in 1125 and the determined positions of the light beams in the recorded images. The photogrammetrically determining may include determining the position according to the photogrammetric technique described below in connection with FIG. 14.

Computer Processor System

Figure 12:
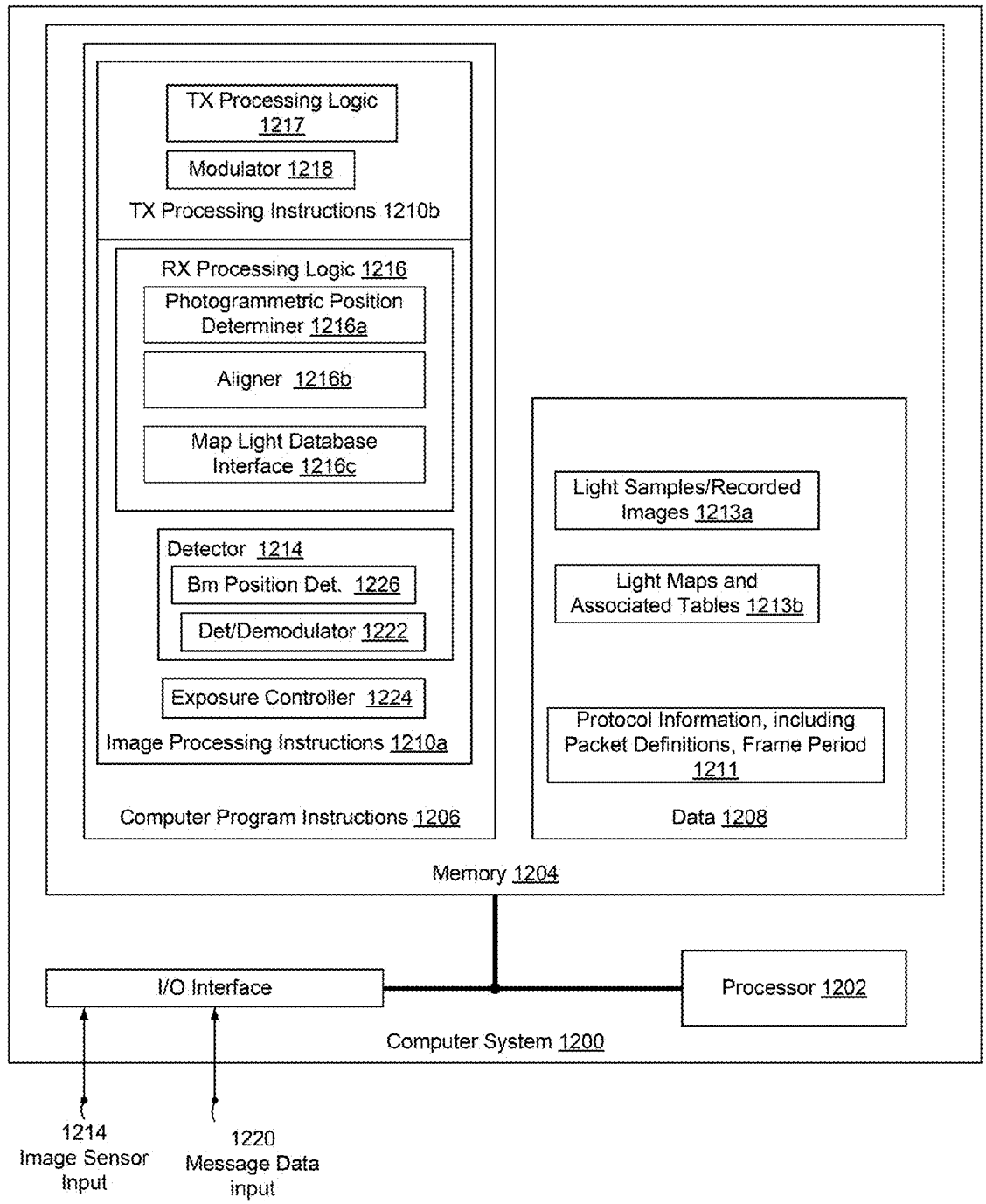
FIG. 12 is a block diagram of an example computer processor system configured for multiphase sampling processing.

FIG. 12 is a block diagram of an example computer processor system 1200 configured for multiphase sampling processing, including light transmitter processing such as light modulation, etc., and light receiver processing such as demodulation, etc., in accordance with examples described herein. In FIG. 12, various transmit and receive components/modules of computer system 1200 are depicted together for descriptive convenience. It is understood that various ones of the components/modules may reside in separate light transmitter and light receiver systems, as appropriate.

Computer system 1200 may include one or more instruction processing units, illustrated here as a processor 1202, which may include a processor, one or more processor cores, or a micro-controller.

Computer system 1200 may include memory, cache, registers, and/or storage, illustrated here as memory 1204.

Memory 1204 may include one or more non-transitory computer readable mediums encoded with a computer program, including instructions 1206.

Memory 1204 may include data 1208 to be used by processor 1202 in executing instructions 1206, and/or generated by processor 1202 during execution of instructions 1206. Data 1208 includes protocol information 1211, including light packet protocol definitions, frame periods, and so on, recorded images 1213a from an imager, such as a camera, which may be received through the I/O interface, and light maps and their associated tables (light IDs and real-world position information) 1213b.

Instructions 1206 include instructions 1210a for light receiver (RX) processing of recorded images as described in one of the examples above, including photogrammetric position determination. Instructions 1210a include instructions for implementing a detector 1214, a receiver control/protocol processor 1216, and an exposure controller 1224, as described in one or more examples above. Detector instructions 1214 further include instructions for implementing a detector/demodulator 1222 such as a FSOOK or UFSOOK detector/demodulator, and a beam position determiner 1226, as described in one or more examples above. Instruction for implementing controller/processor 1216 include photogrammetric position determiner instructions 1216a to determine receiver positions in accordance with photogrammetric equations, aligner instructions 1216b to align a light map with recorded light beams, and map light interface instructions 1216c to request and receive light maps from light database, as described in one or more examples above.

Instructions 1206 may also include instructions 1210b for a light transmitter operating in accordance with one or more multiphase sampling embodiments described above. Instructions 1210b include instructions 1217 for controlling the transmitter, and 1218 for implementing a modulator, such as a FSOOK modulator, as described in one or more examples above.

The instructions described above and depicted in FIG. 12 are also referred to as processing modules to implement the functions described in one or more examples above.

Wireless Communication Receiver System

Figure 13:
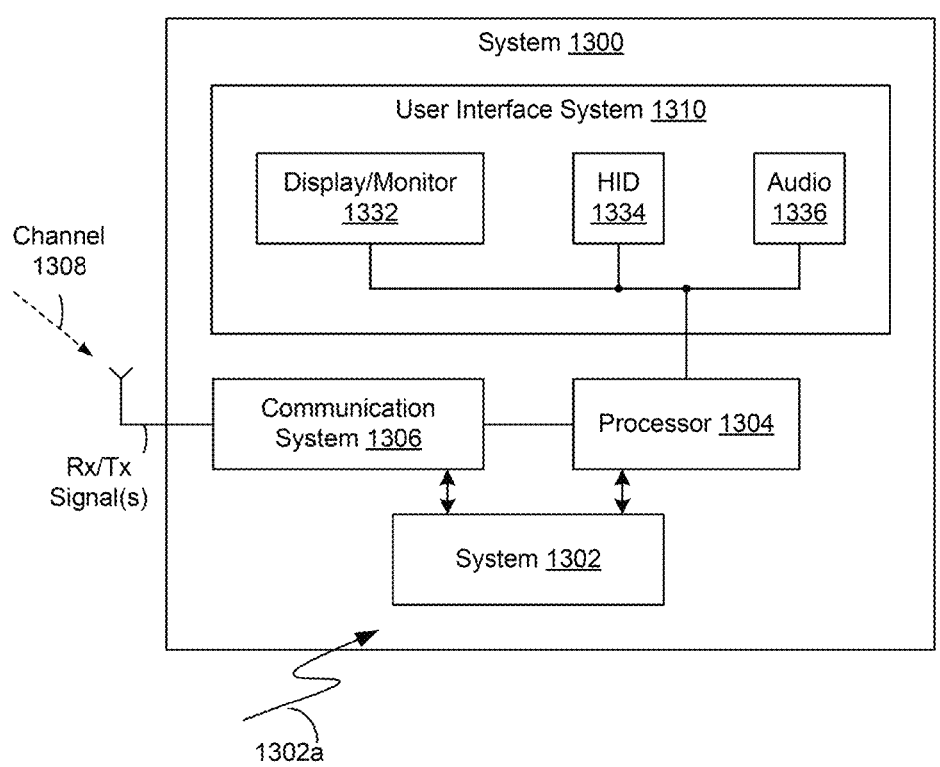
FIG. 13 is a block diagram of an example system including a system or apparatus to sample and record light beams as a sequence of images and process the recorded images in accordance with one or more embodiments described herein.

FIG. 13 is a block diagram of an example system 1300 including a system or apparatus 1302 to sample and record light beams 1302a as a sequence of images and process the recorded images as described in one or more examples above, including photogrammetric position determination.

System 1302 may be implemented as described in one or more examples herein, including a light receiver. System 1300 may include a processor 1304.

System 1300 may include a communication system, including a transceiver, 1306 to interface between system 1302, processor system 1304, and a communication network over a channel 1308. Communication system 1306 may include a wired and/or wireless communication system. System 1302, such as a light receiver, may retrieve map light information from a remote light map database (not shown in FIG. 13) over communication channel 1308.

System 1300 or portions thereof may be implemented within one or more integrated circuit dies, and may be implemented as a system-on-a-chip (SoC).

System 1300 may include a user interface system 1310 to interface system 1310.

User interface system 1310 may include a monitor or display 1332 to display information from processor 1304.

User interface system 1310 may include a human interface device (HID) 1334 to provide user input to processor 1304. HID 1334 may include, for example and without limitation, one or more of a keyboard, a cursor device, a touch-sensitive device, and or a motion and/or imager. HID 1334 may include a physical device and/or a virtual device, such as a monitor-displayed or virtual keyboard.

User interface system 1310 may include an audio system 1336 to receive and/or output audible sound.

System 1300 may further include a transmitter system to transmit signals from system 1300.

System 1300 may correspond to, for example, a computer system, a personal communication device, and/or a television set-top box.

System 1300 may include a housing, and one or more of communication system 1302, digital processor system 1304, user interface system 1310, or portions thereof may be positioned within the housing. The housing may include, without limitation, a rack-mountable housing, a desk-top housing, a lap-top housing, a notebook housing, a net-book housing, a tablet housing, a set-top box housing, a portable housing, and/or other conventional electronic housing and/or future-developed housing. For example, communication system 1302 may be implemented to receive a digital television broadcast signal, and system 1300 may include a set-top box housing or a portable housing, such as a mobile telephone housing. System 1300 may be implemented in a camera-equipped smartphone, or may be implemented as part of a wireless router.

General Treatment of Photogrammetric Positioning

The principle of photogrammetric positioning is observing multiple visual features, assumed to be lights, such as LEDs in an LED constellation or array, with known positions such that the observer can ascertain their position relative to the LED constellation.

Figure 14:
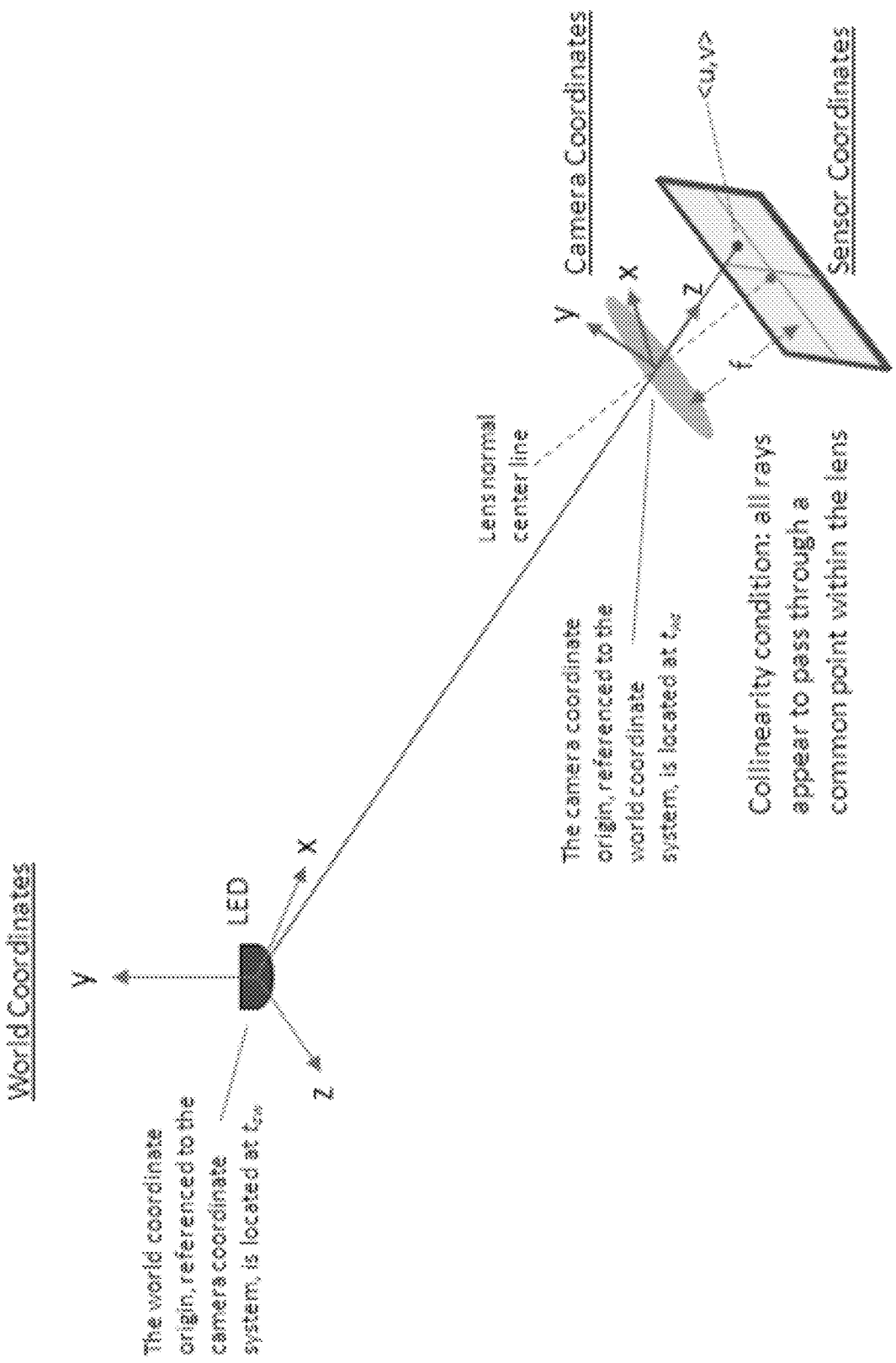
FIG. 14 is an illustration helpful in describing the principle of photogrammetric positioning, In the drawings, the leftmost digit(s) of a reference number identifies the drawing in which the reference number first appears.

FIG. 14 is an illustration helpful in describing the principle of photogrammetric positioning, including the relevant equations. In FIG. 14, "camera" may be interpreted more generally as "light receiver," and both "image sensor" and "sensor" correspond to "light sensor."

With reference to FIG. 14, first, the following three coordinate systems involved with the positioning are defined.

i. 2-D sensor coordinates ii. 3-D camera coordinates
iii. 3-D "world" or "real-world" coordinates.

The basic process is as follows:
i. map the LED images into sensor coordinates described by vector <u,v>
ii. map the sensor coordinate points into camera coordinates described by vector $t_{cw}$
iii. translate the origin of the camera coordinate system to real world coordinates described by vector $t_{wc}$.

The mapping of the light features onto the image sensor plane is based upon the collinearity condition given below.

$$u = -f \frac{s_1\alpha + s_2\beta + x_{cw} + s_3}{s_7\alpha + s_8\beta + z_{cw} + s_9} \quad \text{Eq. 1}$$

$$v = -f \frac{s_4\alpha + s_5\beta + x_{cw} + s_6}{s_7\alpha + s_8\beta + z_{cw} + s_9} \quad \text{Eq. 2}$$

We introduce the notation of $$u' \equiv \frac{u}{-f}, v' \equiv \frac{v}{-f}$$

to rewrite equations 1 and 2 as $$u' = \frac{s_1\alpha + s_2\beta + x_{cw} + s_3}{s_7\alpha + s_8\beta + z_{cw} + s_9} \quad \text{Eq. 3}$$

$$v' = \frac{s_4\alpha + s_5\beta + y_{cw} + s_6}{s_7\alpha + s_8\beta + z_{cw} + s_9} \quad \text{Eq. 4}$$

The $s_i$ values are related to the rotational inclination matrix, which is obtained as a decomposition of the general rotational matrix into its azimuth and inclination components $$R_{wc} = R_{wc}^a \cdot R_{wc}^i. \quad \text{Eq. 5}$$

Each element of $R_{wc}^i$ is directly determined by reading the inclination sensor which is assumed to be embedded within the image sensor. Because the viewing transformation from the point $x_W$ (world coordinates) to point $x_c$ (camera coordinates) is given by $x_c = (R_{wc}^i)^{-1} \cdot (R_{wc}^a)^{-1} \cdot x_w + t_{cw}$, further equation manipulation will require that we utilize the inverses of the compound rotational matrix.

The components of the inverse azimuth rotational matrix, which need to be determined as part of the positioning calculations, are given by $$(R_{wc}^a)^{-1} \begin{bmatrix} \cos\theta & 0 & -\sin\theta \\ 0 & 1 & 0 \\ \sin\theta & 0 & \cos\theta \end{bmatrix} = \begin{bmatrix} \alpha & 0 & -\beta \\ 0 & 1 & 0 \\ \beta & 0 & \alpha \end{bmatrix}. \quad \text{Eq. 6}$$

The $s_i$ values are given by the relationship $$\begin{bmatrix} s_1 & s_2 & s_3 \\ s_4 & s_5 & s_6 \\ s_7 & s_8 & s_9 \end{bmatrix} = \begin{bmatrix} r_{11}^i x_w + r_{13}^i z_w & r_{13}^i x_w - r_{13}^i z_w & r_{12}^i y_w \\ r_{21}^i x_w + r_{23}^i z_w & r_{23}^i x_w - r_{21}^i z_w & r_{22}^i y_w \\ r_{31}^i x_w + r_{33}^i z_w & r_{33}^i x_w - r_{31}^i z_w & r_{32}^i y_w \end{bmatrix} \quad \text{Eq. 7}$$

where the $[r_{mn}^i]$ values are determined by the inverse of the inclination matrix as $$(R_{wc}^i)^{-1} = \begin{bmatrix} r_{11}^i & r_{12}^i & r_{13}^i \\ r_{21}^i & r_{22}^i & r_{23}^i \\ r_{31}^i & r_{32}^i & r_{33}^i \end{bmatrix}. \quad \text{Eq. 8}$$

Equations 3 and 4 can be manipulated into a system of linear equations as $$u's_7\alpha + u's_8\beta + u'z_{cw} + u's_9 = s_1\alpha + s_2\beta + x_{cw} + s_3$$

$$\alpha(u's_7 - s_1) + \beta(u's_8 - s_2) - x_{cw} + u'z_{cw} = s_3 - u's_9 \quad \text{Eq. 9}$$

$$v's_7\alpha + v's_8\beta + v'z_{cw} + v's_9 = s_4\alpha + s_5\beta + y_{cw} + s_6$$

$$\alpha(v's_7 - s_4) + \beta(v's_8 - s_5) - y_{cw} + v'z_{cw} = s_6 - v's_9 \quad \text{Eq. 10}$$

Equations 9 and 10 can be put into matrix form as $$\begin{bmatrix} u's_7 - s_1 & u's_8 - s_2 & -1 & 0 & u' \\ v's_7 - s_4 & v's_8 - s_5 & 0 & -1 & v' \end{bmatrix} \begin{bmatrix} \alpha \\ \beta \\ x_{cw} \\ y_{cw} \\ z_{cw} \end{bmatrix} = \begin{bmatrix} s_3 - u's_9 \\ s_6 - v's_9 \end{bmatrix}. \quad \text{Eq. 11}$$

For the $i^{th}$ light feature we define $$A_i = \begin{bmatrix} u's_7 - s_1 & u's_8 - s_2 & -1 & 0 & u' \\ v's_7 - s_4 & v's_8 - s_5 & 0 & -1 & v' \end{bmatrix} \quad \text{Eq. 12}$$

$$p = \begin{bmatrix} \alpha \\ \beta \\ x_{cw} \\ y_{cw} \\ z_{cw} \end{bmatrix}, t_{cw} = \begin{bmatrix} x_{cw} \\ y_{cw} \\ z_{cw} \end{bmatrix} \therefore p = \begin{bmatrix} \alpha \\ \beta \\ t_{cw} \end{bmatrix} \quad \text{Eq. 13}$$

$$b_i = \begin{bmatrix} s_3 - u's_9 \\ s_6 - v's_9 \end{bmatrix} \quad \text{Eq. 14}$$

such that $A_i \cdot p = b_i$.

When multiple features are detected, a system of linear simultaneous equations describing p can be obtained that performs a least mean square estimate as $$p = \begin{bmatrix} A_1 \\ A_2 \\ \vdots \\ A_n \end{bmatrix}^+ \begin{bmatrix} b_1 \\ b_2 \\ \vdots \\ b_n \end{bmatrix} \quad \text{Eq. 15}$$

where i>=3 (i.e. >=3 features), with at least 3 features being non-collinear, and the superscript $^+$ notation indicates the pseudo-inverse operation.

The camera origin is then translated and rotated such that its location is in terms of world coordinates, which yields the desired solution of $$t_{wc} = -R_{wc} \cdot t_{cw}. \quad \text{Eq. 16}$$

The camera azimuth orientation angle is derived from Eq. 13 as $$\theta = a\tan2\left(\frac{\beta}{\alpha}\right). \quad \text{Eq. 17}$$

Methods and systems disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. Software may include a computer readable medium encoded with a computer program including instructions to cause a processor to perform one or more functions in response thereto. The computer readable medium may include one or more non-transitory mediums. The processor may include a general purpose instruction processor, a controller, a microcontroller, and/or other instruction-based processor.

Methods and systems are disclosed herein with the aid of functional building blocks illustrating functions, features, and relationships thereof. At least some of the boundaries of these functional building blocks have been arbitrarily defined herein for the convenience of the description. Alternate boundaries may be defined so long as the specified functions and relationships thereof are appropriately performed.

Various computer program, method, apparatus, and system embodiments are described herein.

A. A Computer Program Product (CPP) Embodiment

A CPP embodiment includes a non-transitory computer readable medium encoded with a computer program, including instructions to cause a processor to:

access recording spatially-separated, modulated (anchor) light beams from modulated lights and unmodulated (non-anchor) light beams from unmodulated lights of a light array;

demodulate light identifiers (IDs) from the recorded modulated light beams;

access a predetermined map of the light array based on the demodulated light IDs;

positionally align the map with the recorded modulated light beams;

access positions of the modulated and the unmodulated lights in the light array based on the aligned map; and photogrammetrically determine a position of the light receiver relative to the light array based on the accessed light positions.

The map of the light array may define a spatial arrangement of map modulated lights and map unmodulated lights that matches a reduced-scale spatial arrangement of the modulated lights and the unmodulated lights in the light array, each map light associated with (i) a light ID, and (ii) a corresponding position in the light array.

The instructions to cause the processor to positionally align may include instructions to cause the processor to positionally align the map modulated lights with the recorded modulated beams having the same light IDs, and thereby align the map unmodulated lights with the recorded unmodulated light beams.

The instructions to cause the processor to access may include instructions to cause the processor to access light IDs corresponding to aligned pairs of (i) map unmodulated lights and recorded modulated light beams, and (ii) map unmodulated lights and recorded unmodulated light beams.

The instructions to cause the processor to positionally align may also include instructions to cause the processor to perform rotating and scaling of the map relative to the recorded modulated light beams so as to positionally align the map with the recorded modulated light beams.

The instructions to cause the processor to access may include instructions to cause the processor to:

transmit a request for a map of a light array containing lights having the demodulated light IDs; and receive the requested map and associated data.

The modulated light beams may each comprises light modulated to indicate the ID as a series of bits, each bit represented as light that is intensity modulated over a bit period at one of multiple FSK frequencies indicative of the bit The instructions to cause the processor to demodulate may include instructions to cause the processor to determine, from each recorded modulated light beam, a series of FSK frequencies at which the recorded modulated light beam is intensity modulated, each of the determined frequencies indicating a demodulated bit.

B. Apparatus Embodiment

An apparatus embodiment comprises:

a light sensor to record spatially-separated, modulated light beams from modulated lights and unmodulated light beams from unmodulated lights of a light array; and processing modules to:

demodulate light identifiers (IDs) from the recorded modulated light beams;

access a predetermined map of the light array based on the demodulated light IDs;

positionally align the map with the recorded modulated light beams;

access positions of the modulated and the unmodulated lights in the light array based on the aligned map; and photogrammetrically determine a position of the light receiver relative to the light array based on the accessed light positions.

The map of the light array may define a spatial arrangement of map modulated lights and map unmodulated lights that matches a reduced-scale spatial arrangement of the modulated lights and the unmodulated lights in the light array, each map light associated with (i) a light ID, and (ii) a corresponding position in the light array.

The processing modules may be further configured to positionally align the map modulated lights with the recorded modulated beams having the same light IDs, and thereby align the map unmodulated lights with the recorded unmodulated light beams.

The processing modules may be configured to access light IDs corresponding to aligned pairs of (i) map unmodulated lights and recorded modulated light beams, and (ii) map unmodulated lights and recorded unmodulated light beams.

The processing modules may be further configured to rotate and scale the map so as to positionally align the map with the recorded modulated light beams.

The processing modules may be configured to transmit a request for a map of a light array containing lights having the demodulated light IDs; and receive the requested map and associated data.

The modulated light beams may each comprises light modulated to indicate the ID as a series of bits, each bit represented as light that is intensity modulated over a bit period at one of multiple FSK frequencies indicative of the bit The processing modules may be further configured to determine, from each recorded modulated light beam, a series of FSK frequencies at which the recorded modulated light beam is intensity modulated, each of the determined frequencies indicating a demodulated bit.

The apparatus may further comprise:

a communication system to communicate with a network;

a processor to interface between the communication system and a user interface system; and
a housing,
wherein the processor, the communication system, and the light transmitter are positioned within the housing.

C. Method Embodiment

A method embodiment comprises:

in a light receiver, recording spatially-separated, modulated light beams from modulated lights and unmodulated light beams from unmodulated lights of a light array;

demodulating light identifiers (IDs) from the recorded modulated light beams;

accessing a predetermined map of the light array based on the demodulated light IDs;

positionally aligning the map with the recorded modulated light beams;

accessing positions of the modulated and the unmodulated lights in the light array based on the aligned map; and photogrammetrically determining a position of the light receiver relative to the light array based on the accessed light positions.

The map of the light array may define a spatial arrangement of map modulated lights and map unmodulated lights that matches a reduced-scale spatial arrangement of the modulated lights and the unmodulated lights in the light array, each map light associated with (i) a light ID, and (ii) a corresponding position in the light array; and The positionally aligning may include positionally aligning the map modulated lights with the recorded modulated beams having the same light IDs, and thereby aligning the map unmodulated lights with the recorded unmodulated light beams.

The accessing includes accessing light IDs corresponding to aligned pairs of (i) map unmodulated lights and recorded modulated light beams, and (ii) map unmodulated lights and recorded unmodulated light beams.

The positionally aligning may include rotating and scaling the map relative to the recorded modulated light beams so as to positionally align the map with the recorded modulated light beams.

The accessing may include:

transmitting a request for a map of a light array containing lights having the demodulated light IDs; and receiving the requested map and associated data.

The modulated light beams may each comprise light modulated to indicate the ID as a series of bits, each bit represented as light that is intensity modulated over a bit period at one of multiple FSK frequencies indicative of the bit.

The demodulating may include determining, from each recorded modulated light beam, a series of FSK frequencies at which the recorded modulated light beam is intensity modulated, each of the determined frequencies indicating a demodulated bit.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the examples disclosed herein.

What is claimed is:

1. A non-transitory computer readable medium encoded with a computer program, including instructions to cause a processor to:

access a sequence of images of at least a portion of an array of spatially separated modulated and unmodulated lights recorded by an image capture device;

identify images of lights of the array recorded in the sequence of images;

demodulate a light identifiers (ID) for each modulated light recorded in the sequence of images from the images of the respective modulated light;

retrieve a map of lights of at least a portion of the array based on the demodulated light IDs, wherein the map includes representations of modulated lights of the array that correspond to the demodulated light IDs, representations of unmodulated lights of the array, and light IDs of the unmodulated lights;

positionally align the map with the images of lights recorded in the sequence of images to determine light IDs of unmodulated lights recorded in the sequence of images;

retrieve position information for lights of the array recorded in the sequence of images, including to retrieve position information for each modulated light recorded in the sequence of images based on the respective demodulated light ID, and to retrieve position information for unmodulated lights of the array based on the light IDs of the unmodulated lights recorded in the sequence of images; and photogrammetrically determine a position of the image capture device relative to the array based on the retrieved position information of the modulated and unmodulated lights recorded in the sequence of images accessed light positions.

2. The computer readable medium of claim 1, wherein:

the map defines a reduced-scale spatial arrangement of modulated and unmodulated lights of the array, and includes a light ID and position information for each light represented in the map; and the instructions to cause the processor to positionally align include instructions to cause the processor to positionally align the representations of modulated lights of the map with the images of modulated lights based on respective light IDs to align the representations of unmodulated lights of the map with the images of unmodulated lights recorded in the sequence of images.

3. The computer readable medium of claim 2, wherein the instructions to cause the processor to retrieve position information include instructions to cause the processor to retrieve the position information based on light IDs corresponding to aligned pairs of lights represented in the map and images of lights recorded in the sequence of images.

4. The computer readable medium of claim 2, wherein the instructions to cause the processor to positionally align include instructions to cause the processor to rotate and scale the map to positionally align the map with the images of lights recorded in the sequence of images.

5. The computer readable medium of claim 1, wherein the instructions to cause the processor to retrieve position information include instructions to cause the processor to:

transmit a request for a map of a light array containing lights having the demodulated light IDs; and receive the requested map and associated data.

6. The computer readable medium of claim 1, wherein the instructions to cause the processor to demodulate include instructions to cause the processor to demodulate bits of a light identifier based on frequencies at which a light recorded in the sequence of images varies in intensity.

7. An apparatus, comprising:

an image capture device to record a sequence of images of at least a portion of an array of spatially separated modulated and unmodulated lights;
a processor and memory configured to:
identify images of lights of the array recorded in the sequence of images;
demodulate a light identifiers (ID) for each modulated light recorded in the sequence of images from the images of the respective modulated light;
retrieve a map of lights of at least a portion of the array based on the demodulated light IDs, wherein the map includes representations of modulated lights of the array that correspond to the demodulated light IDs, representations of unmodulated lights of the array, and light IDs of the unmodulated lights;
positionally align the map with the images of lights recorded in the sequence of images to determine light IDs of unmodulated lights recorded in the sequence of images;
retrieve position information for lights of the array recorded in the sequence of images, including to retrieve position information for each modulated light recorded in the sequence of images based on the respective demodulated light ID, and to retrieve position information for unmodulated lights of the array based on the light IDs of the unmodulated lights recorded in the sequence of images; and
photogrammetrically determine a position of the image capture device relative to the array based on the retrieved position information of the modulated and unmodulated lights recorded in the sequence of images.

8. The apparatus of claim 7, wherein:
the map defines a reduced-scale spatial arrangement of the modulated and unmodulated lights of the array, and includes a light ID and position information for each light represented in the map; and
the processor and memory are further configured to positionally align the representations of modulated lights of the map with the images of modulated lights based on respective light IDs to align the representations of unmodulated lights of the map with unmodulated lights recorded in the sequence of images.

9. The apparatus of claim 8, wherein the processor and memory are further configured to retrieve the position information based on light IDs corresponding to aligned pairs of lights represented in the map and images of lights recorded in the sequence of images.

10. The apparatus of claim 8, wherein the processor and memory are further configured to rotate and scale the map to positionally align the map with images of lights recorded in the sequence of images.

11. The apparatus of claim 7, wherein the processor and memory are further configured to:
transmit a request for a map of a light array containing lights having the demodulated light IDs; and
receive the requested map and associated data.

12. The apparatus of claim 7, wherein the processor and memory are further configured to demodulate bits of a light identifier based on frequencies at which a light recorded in the sequence of images varies in intensity.

13. The apparatus of claim 7, further including
a user interface system;
a communication system to communicate with one or more of a communication network, the processor, and the user interface system; and
a housing to hold the processor and memory, the image capture device, the communication system, and at least a portion of the user interface system.

14. The apparatus of claim 13, wherein:
the communication system includes a wireless communication system; and
the housing includes a mobile hand-held housing and is configured to further hold a battery.

15. A method, comprising:
recording a sequence of images of at least a portion of an array of spatially separated modulated and unmodulated lights;
identifying images of lights of the array recorded in the sequence of images;
demodulating a light identifiers (ID) for each modulated light recorded in the sequence of images from the images of the respective modulated light;
retrieving a map of lights of at least a portion of the array based on the demodulated light IDs, wherein the map includes representations of modulated lights of the array that correspond to the demodulated light IDs, representations of unmodulated lights of the array, and light IDs of the unmodulated lights;
positionally aligning the map with the images of lights recorded in the sequence of images to determine light IDs of unmodulated lights recorded in the sequence of images;
retrieve position information for lights of the array recorded in the sequence of images, including to retrieve position information for each modulated light recorded in the sequence of images based on the respective demodulated light ID, and to retrieve position information for unmodulated lights of the array based on the light IDs of the unmodulated lights recorded in the sequence of images; and
photogrammetrically determining a position of the image capture devices relative to the array based on the retrieved position information of the modulated and unmodulated lights recorded in the sequence of images.

16. The method of claim 15, wherein:
the map defines a reduced-scale spatial arrangement of the modulated and unmodulated lights of the array, and includes a light ID and position information for each light represented in the map; and
the positionally aligning includes positionally aligning the representations of modulated lights of the map with the images of modulated lights based on respective light IDs to align the representations of unmodulated lights of the map with the images of unmodulated lights recorded in the sequence of images.

17. The method of claim 16, wherein the retrieving position information includes retrieving the position information based on light IDs corresponding to aligned pairs of lights represented in the map and images of lights recorded in the sequence of images.

18. The method of claim 16, wherein the positionally aligning includes rotating and scaling the map to positionally align the map with the images of lights recorded in the sequence of images.

19. The method of claim 15, wherein the retrieving positional information includes:
transmitting a request for a map of a light array containing lights having the demodulated light IDs; and
receiving the requested map and associated data.

20. The method of claim 15, wherein the demodulating includes demodulating bits of a light identifier based on frequencies at which a light recorded in the sequence of images varies in intensity.

* * * * *